(12) United States Patent
Venkatachalam

(10) Patent No.: US 7,583,852 B2
(45) Date of Patent: Sep. 1, 2009

(54) METHOD OF FILTERING AN IMAGE FOR HIGH PRECISION MACHINE VISION METROLOGY

(75) Inventor: Vidya Venkatachalam, Bellevue, WA (US)

(73) Assignee: Mitutoyo Corporation, Kawaski-shi (JP)

( * ) Notice: Subject to any disclaimer, the term of this patent is extended or adjusted under 35 U.S.C. 154(b) by 972 days.

(21) Appl. No.: 10/974,423

(22) Filed: Oct. 26, 2004

(65) Prior Publication Data

US 2006/0088202 A1    Apr. 27, 2006

(51) Int. Cl.
    *G06K 9/40*    (2006.01)
    *G06K 9/00*    (2006.01)

(52) U.S. Cl. ...................................... 382/260; 382/152

(58) Field of Classification Search .................. 382/260, 382/141–152, 209, 216–219; 715/700, 716, 715/764; 717/109; 356/237.2, 237.1
    See application file for complete search history.

(56) References Cited

U.S. PATENT DOCUMENTS

| 5,481,712 | A | * | 1/1996 | Silver et al. ................ 717/109 |
| 5,859,698 | A | * | 1/1999 | Chau et al. ............... 356/237.2 |
| 6,542,180 | B1 | | 4/2003 | Wasserman et al. |
| 6,627,863 | B2 | | 9/2003 | Wasserman |
| 2002/0076096 | A1 | | 6/2002 | Silber et al. |
| 2005/0031191 | A1 | | 2/2005 | Venkatachalam |
| 2005/0213807 | A1 | | 9/2005 | Wasserman |
| 2006/0023937 | A1 | | 2/2006 | Tessadro |

FOREIGN PATENT DOCUMENTS

EP    0431962 A2    6/1991
EP    1134697 A2    9/2001

OTHER PUBLICATIONS

Turney et al., Recognizing Partially Occluded Parts, IEEE 0162-8828/854/0070-0410, 1985.*
Brown, L.G., "A Survey of Image Registration Techniques" *ACM Comp. Surv.* 24(4):325-376, 1992.
Li, H., et al., "A Model-Based Approach for Automated Feature Extraction in Fundus Images," *Proceedings of the Ninth IEEE International Conference on Computer Vision*, Nice, France, Oct. 13-16, 2003, vol. 1, pp. 394 ff.

(Continued)

*Primary Examiner*—Sherali Ishrat
(74) *Attorney, Agent, or Firm*—Christensen O'Connor Johnson Kindness PLLC

(57) ABSTRACT

A structured morphology filtering method is disclosed for filtering an image for high precision machine vision metrology using specifically-determined structuring elements to precisely preserve the location of specific features in the filtered image. A selected structuring element shape generally exhibits geometric similarity with at least a portion of the feature to be preserved in the filtered image. The structuring element may be oriented to corresponds to the orientation of the feature to be inspected. For example, for a linear feature to be inspected, the optimal structuring element is a line or narrow rectangle at the same orientation, while for images of circles, it is a circle. The orientation of the structuring element may be determined or adjusted automatically during a set of automatic inspection operations, based on an automatic determination of the orientation of the feature to be inspected.

20 Claims, 25 Drawing Sheets

OTHER PUBLICATIONS

*Quick Vision CNC Vision Measuring System*, Bulletin No. 1576, Mitutoyo America Corporation, Aurora, Ill., Oct. 2002, pp. 1-24.

*QVPAK 3D CNC Vision Measuring Machine Operation Guide*, Version 2.0, Manual No. 4911GB, Series No. 359, Mitutoyo Corporation & Micro Encoder Inc., Kanagawa, Japan, Sep. 1996.

*QVPAK 3D CNC Vision Measuring Machine User's Guide*, Version 7, 1st ed., Manual No. 99MCB225A, Series No. 359, Mitutoyo Corporation & Micro Encoder Inc., Kanagawa, Japan, Jan. 2003.

Sasada, R., et al., "Stationary Grid Pattern Removal Using 2-Dimensional Technique for Moiré-Free Radiographic Image Display," Galloway, Robert L., Jr. (ed.), *Visualization, Image-Guided Procedures, and Display, Proceedings of the SPIE—The International Society for Optical Engineering*, vol. 5029, San Diego, Calif., Feb. 16-18, 2003, pp. 688-697.

Shen, J., "Inpainting and the Fundamental Problem of Image Processing," *SIAM News* 36(5):1-4, Jun. 2003.

Fouques, J.-Y., and P. Cohen, "Partition Filters: A New Class of Morphological Operators for Segmenting Textured Images," Proceedings of the Int'l Conference on Acoustics, Speech, and Signal Processing (ICASSP 89), Glasgow, Scotland, May 23-26, 1989, vol. 3, "Multidimensional Signal Processing: Audio & Electroacoustics," pp. 1707-1710.

Modayur, B.R., et al., "Muser: A Prototype Musical Score Recognition System Using Mathematical Morphology," Machine Vision and Applications 6(2-3):140-150, Mar. 1993.

Sanz, J.L.C., and A.K. Jain, Machine Vision Techniques for Inspection of Printed Wiring Boards and Thick-Film Circuits, Journal of the Optical Society of America A 3(9):1465-1482, Sep. 1986.

SDC Information Systems, "SDC Morphology Toolbox V1.3 [for MATLAB]: Introduction," Apr. 2004, http://web.archive.org/web/20041016154403/http://mmorph.com/mxmorph/html/Intro.html> [retrieved Jan. 23, 2008], 3 pages.

SDC Information Systems, "SDC Morphology Toolbox V1.3 [for MATLAB]: Demonstrations," Apr. 2004, http://web.archive.org/web/20041016155418/http://mmorph.com/mxmorph/html/mmdemos/mmdpcb.html> [retrieved Jan. 23, 2008], 4 pages.

Extended European Search Report dated Aug. 6, 2008, issued in corresponding Application No. EP 05019425.7, filed Sep. 7, 2005.

* cited by examiner

METHOD OF FILTERING AN IMAGE FOR HIGH PRECISION MACHINE VISION METROLOGY

FIELD OF THE INVENTION

The invention relates generally to machine vision inspection systems, and more particularly to a method of filtering an image.

BACKGROUND OF THE INVENTION

Precision machine vision inspection systems can be used to obtain precise dimensional measurements of inspected objects and to inspect various other object characteristics. Such systems may include a computer, a user interface, a lighting system, a camera and optical system, and a precision stage that is movable in multiple directions to allow an operator to position the camera to image various features of a workpiece. The user interface, among other things, generally includes various video tools that are positionable on an inspection image. In this way a user of the machine vision inspection system can position and operate the video tools to perform image processing operations that are useful for various control and inspection operations, while having little or no knowledge of image processing. One exemplary prior art system having such features, of a type that can be characterized as a general-purpose "off-line" precision vision system, is the commercially available QUICK VISION™ series of vision inspection machines and QVPAK™ software available from Mitutoyo America Corporation (MAC), located in Aurora, Ill. The features and operation of the QUICK VISION™ series of vision inspection machines, and the QVPAK™ software, including the user interface and various video tools are generally described, for example, in the QVPAK 3D CNC Vision Measuring Machine Users Guide, published January 2003 and the QVPAK 3D CNC Vision Measuring Machine Operation Guide, published September 1996, each of which is incorporated herein by reference in its entirety. This product, as exemplified, for example, by the QV-302 Pro model, uses a microscope-type optical system to provide images of a workpiece at various magnifications, and includes all of the features outlined above.

Such general-purpose "off-line" precision vision systems are characterized by their versatility, and they provide the ability for a user or an automatic program to rapidly change their configuration and imaging parameters in order to perform a wide variety of inspection tasks on various types of objects or inspection workpieces, or various aspects of a single workpiece.

General purpose precision machine vision inspection systems, such as the QUICK VISION™ system, are also generally programmable and operable to provide automated video inspection. It is generally desirable that such systems include features and tools that simplify the programming and operation of such systems, such that operation and programming can be performed reliably by "non-expert" operators.

Automated video inspection metrology instruments generally have a programming capability that allows an automatic inspection event sequence to be defined by the user for each particular workpiece configuration. The programming capability also typically provides the ability to store and/or output the results of the various inspection operations. Such programming can be implemented either in a deliberate manner, such as text-based programming, for example, or through a recording mode that progressively "learns" the inspection event sequence by storing a sequence of machine control instructions corresponding to a sequence of inspection operations performed by a user, or through a combination of both methods. Such a recording mode is often referred to as "learn mode," "training mode," or "teach mode."

In these techniques, the machine control instructions are generally stored as a part program that is specific to the particular workpiece configuration. The ability to create part programs with instructions that automatically perform a predetermined sequence of inspection operations during a "run mode" of operation provides several benefits, including enhanced inspection repeatability, as well as the ability to automatically execute the same part program on a plurality of compatible machine vision inspection systems and/or at a plurality of times.

In machine vision systems, "occlusion" type problems sometimes arise, that is, situations in which a foreground object interferes with the viewing or inspection of a background object. Occlusion problems have generally not been addressed by general purpose machine vision systems for inspection and measurement of workpieces. Previously, there have been no readily programmable alternatives. In general, the user had to carefully size and place tools using human judgment to avoid the occluding object and/or shadow. In such cases, when inspecting images having foreground and background features, such as edge features, in close proximity to the feature to be inspected, the slightest variation in construction between various workpieces, or lighting and shadows, will cause the carefully positioned and trained tools to fail or provide erroneous results.

Alternatively, various custom-designed image filtering processes and/or boundary-growing or "connection" processes have been designed by specialists to remove the unwanted occluding image features. However, such processes tend to globally alter the image characteristics to some extent and therefore run a high risk of altering the location of various edge features in an image. This is undesirable, especially for various precision metrology operations used to inspect a workpiece, since altering the location of various edge features by even a small amount will lead to inaccurate inspection results that are incompatible with precision inspection requirements. For example, precision inspection tolerances on the order of 5-10 microns or less are commonly desired. For this reason, previously known methods for removing occluding features have provided a poor basis for quality control and inspection operations, particularly in a general purpose machine vision inspection system intended to provide reliable operation and a relatively simple programming environment for relatively unskilled operators.

The present invention is directed to a system and method that overcomes the foregoing and other disadvantages. More specifically, the present invention is directed to a method of filtering an image that preserves the location of specific features in the image with high accuracy.

SUMMARY OF THE INVENTION

The present invention is directed to a method of filtering an image for high precision machine vision metrology, and furthermore to a method that may be implemented by relatively unskilled operators with relatively low risk of introducing significant workpiece measurement errors. In accordance with one aspect of the invention, a morphology-based solution is utilized for the filtering of an image to remove extraneous or occluding features. A dilation-erosion process may be utilized for filtering. However, the dilation-erosion process, when used repeatedly, tends to cause the features that are to be measured to adapt to the shape of the structuring element used. Hence, applying a square shape on a line feature results in shape distortion (unless the line is oriented in the direction of either of the square axes), and likewise, a circle feature. Thus, in order to preserve desired features of a specific shape in images, in accordance with the present invention for morphological filtering of a region of interest or image a structuring element is utilized which has substantially the same shape, or shape and orientation, as the feature to be preserved or inspected. For example, when the feature to be preserved or inspected includes a linear edge, a linear or rectangular type structuring element is used for filtering, and the axis of the structuring element is oriented to be nominally parallel with the linear edge. When the feature to be preserved or inspected is a circle, then the structuring element that is used is a circle. Thus, a structured morphology approach is utilized where the structuring element is selected based on the feature that is to be measured.

In accordance with another aspect of the invention, the filtering method begins by acquiring an image including a workpiece feature to be inspected and an extraneous or occluding feature proximate to the workpiece feature to be inspected. A region of interest is then defined for an operation to be performed by the vision system on at least a portion of the workpiece feature. Structured morphology operations are then performed by the vision system in at least the region of interest. The structured morphology image is then stored. The operation to be performed by the vision system in the region of interest is then performed at a congruent location in the structured morphology image. The operation result is then returned as a result for the acquired image.

In accordance with another aspect of the invention, the structured morphology operations that are to be performed by the vision system in the region of interest begin by first determining the applicable characteristics of the shape, or shape and orientation, of the workpiece element to be preserved in the region of interest. Then, the applicable characteristics of the extraneous feature in the region of interest are determined. For the structuring element, in general the shape, dimensions (e.g., width), and orientation (if applicable) of the structuring element are then chosen based on the applicable characteristics of the workpiece element to be preserved and the extraneous feature. For example, in some embodiments or applications where a linear edge is to be inspected or measured and the extraneous feature is a grid having a grid bar thickness dimension T, and some of the grid bars are at an angle $\phi$ relative to a linear edge to be inspected or measured, a linear or rectangular structuring element that is parallel to the linear edge to be inspected may have a length of approximately $L=T(1/\sin \phi+1/\cos \phi)$, or an upper default limit, whichever is shorter.

In accordance with another aspect of the invention, in various embodiments, determining the length and/or width of the structuring element may include determining whether to apply default limits to the length and/or width of the structuring element. As one example, in various embodiments where a linear or rectangular structuring element is used, it is convenient to set the minimum width for the structuring element to 3 pixels or more, to insure that extraneous features parallel to the structuring element are filtered out. As another example, in various embodiments where it is desired to provide an adequate approximation of a disk-shaped or circular structuring element, a default limit for the diameter is at least 7 pixels. For a better and more reliable approximation of a disk, the disk diameter is at least 13 pixels, and for an even better and more reliable approximation of a disk, the disk diameter is at least 17 pixels. When the extraneous feature to be filtered out is a grid having a bar width or thickness T, in some embodiments it is convenient to set a default limit for the disk diameter d to be an odd number of pixels at least as large as $d=2T+1$ pixels in the image, in order to insure a reasonable tradeoff between filtering speed and reliable and complete filtering. In various embodiments, it is advantageous to set an upper default limit that is approximately the diagonal dimension of the region to be filtered, regardless of the type of structuring element used.

In accordance with another aspect of the invention, the number of morphological processing iterations required to completely remove the extraneous feature are then determined, generally based on one or more dimensions of the extraneous feature to be removed and/or a dimension of the structuring element. The morphological processing iterations are then performed on at least the region of interest. In some embodiments, letting L' denote the relevant span of an occluding feature, morphological filtering according to this invention applies a structuring element having a dimension X along the direction of the relevant span for a number of iterations that is greater than or equal to L'/X. For a circular structuring element, the relevant span is generally the longest "uninterrupted" span of pixels included in the occluding feature along any direction, in the desired region or region of interest in the vicinity of the feature to be inspected. For a linear-type structuring element, the relevant span is generally the broadest uninterrupted span of pixels included in the occluding feature along a direction that is parallel to the orientation of the edges of the linear feature to be inspected, in the desired region or region of interest in the vicinity of the feature to be inspected.

In accordance with another aspect of the invention, determining the applicable characteristics of the shape, or shape and orientation, of the workpiece feature or element to be preserved in the region of interest may be performed manually, semi-automatically, or automatically. In accordance with another aspect of the invention, the determination of the structuring element begins by determining whether CAD data is available for the workpiece feature to be measured. If CAD data is available, then the structuring element is chosen based on the applicable shape and dimensions of the CAD data corresponding to the workpiece feature to be preserved. If CAD data is not available, then a determination is made as to whether the workpiece feature has a regular geometric shape (e.g., line, circle, etc.), based on an acquired image. If the workpiece feature does have a regular shape, then the shape of the structuring element may be chosen from a list and the shape dimensions, or dimensions and orientation, are defined to correspond to the workpiece feature dimensions and orientation. If the workpiece feature does not have a regular shape, then image processing algorithms or operations are utilized to extract the workpiece feature and reconstruct the workpiece feature (e.g., fill-in or smooth), and the dimensions, or dimensions and orientation, of the structuring element are chosen to correspond to the extracted workpiece feature. At the end of the process, the governing characteristics of the workpiece feature or element to be preserved are stored in a part program and/or used to determine the characteristics of the structuring element during a run mode of operation. Furthermore, during the run mode of operation, the previously outlined operations may be repeated based on a stored shape and/or orientation, rather than CAD data or user input, and various location and orientation parameters stored or determined in the part program may be adjusted to compensate for fixturing misalignment, workpiece variations, and the like, to maintain a desired level of morphological filtering and inspection efficacy despite reasonably expected runtime workpiece and image variations.

In accordance with another aspect of the invention, the governing dimension(s) of the extraneous feature may be manually determined. The manual process begins with the user visually determining the location of the relevant dimension, that is, the largest diameter or span of the extraneous feature along an applicable direction or orientation in the vicinity of the feature to be inspected. Vision system tools may then be used to measure the largest diameter or span. The relevant dimension is then stored as a governing extraneous feature dimension.

In accordance with another aspect of the invention, the governing relevant dimension(s) and/or orientation of an extraneous feature may be semi-automatically or automatically determined. In some implementations, during a learning or training mode of operation, the automatic process begins with the user specifying or indicating the shape of at least a portion of the extraneous feature to be measured (e.g., defining a template by selecting at least a relevant portion of the extraneous feature in the image, selecting from a shape library or inputting the shape by any suitable means). A pattern matching algorithm may then be used to locate instances of the specified shape in at least the region of interest in the image. If multiple instances of the specified shape exist, then a preferred instance of the extraneous feature shape is chosen by the user or by a default method. An algorithm is then utilized to determine the orientation and/or the relevant dimension of the extraneous feature. The governing orientation and/or relevant dimension of the extraneous feature is then stored in a part program and/or used to determine the characteristics of the structuring element during a run mode of operation. Furthermore, during the run mode of operation, the previously outlined operations may be repeated based on a stored template and/or the stored orientation and/or relevant dimension, rather than user input, and the structuring element orientation and/or size may be adjusted to compensate for fixturing misalignment, workpiece variations, and the like, to maintain a desired level of morphological filtering efficacy despite reasonably expected runtime workpiece and image variations.

It will be appreciated that the utilization of a filtering approach (e.g., morphology) to remove the extraneous feature (e.g., a grid) can be separated from the actual image feature measurement process (e.g., line tool, circle tool, etc.). In other words, once the image is filtered, any edge measurement tool applicable for ordinary image analysis can be utilized to measure the feature based on the filtered image. Thus, any existing, new, or improved edge measurement methods can be utilized in combination with the methods of the present invention.

It will be appreciated that the methods of the present invention provide for simple operation by a user, in that standardized or familiar types of video tools may be utilized, with few, if any, customization operations. Furthermore, the methods of the present invention provide means that make it simple for a relatively unskilled user to implement the morphological filtering and define the critical parameters that govern the filtering (e.g.—the structuring element parameters). In other words, a user is not required to utilize scripting languages for implementing customized operations to avoid occluding features. Instead, the system allows for the use of pre-programmed icons and the like that even an unskilled user is able to use with minimal training. It should also be appreciated that certain existing machine vision inspection systems can employ various embodiments of the methods according to this invention with minimal or no "retrofit" modifications to such existing machines. In various exemplary embodiments, only the addition of machine vision inspection software methods and/or modifications according to the principles of this invention are required in the retrofit modifications.

Using the systems and methods disclosed herein, position accuracies obtained by experiment for edge features occluded by grids have been in the range of 0-1 μm, and for the diameter of similarly occluded circles have been in the range of 1-2.5 μm. Experimental measurement repeatability of less than <0.1μ has been achieved. Thus, it will be appreciated that morphological filtering systems and methods according to this invention can be used to provide filtered images or image portions that can be used in conjunction with existing machine vision inspection system video tools to measure occluded features with micron and sub-micron accuracy and repeatability, a level of accuracy and repeatability which has not been attained by less sophisticated or comprehensive filtering methods.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
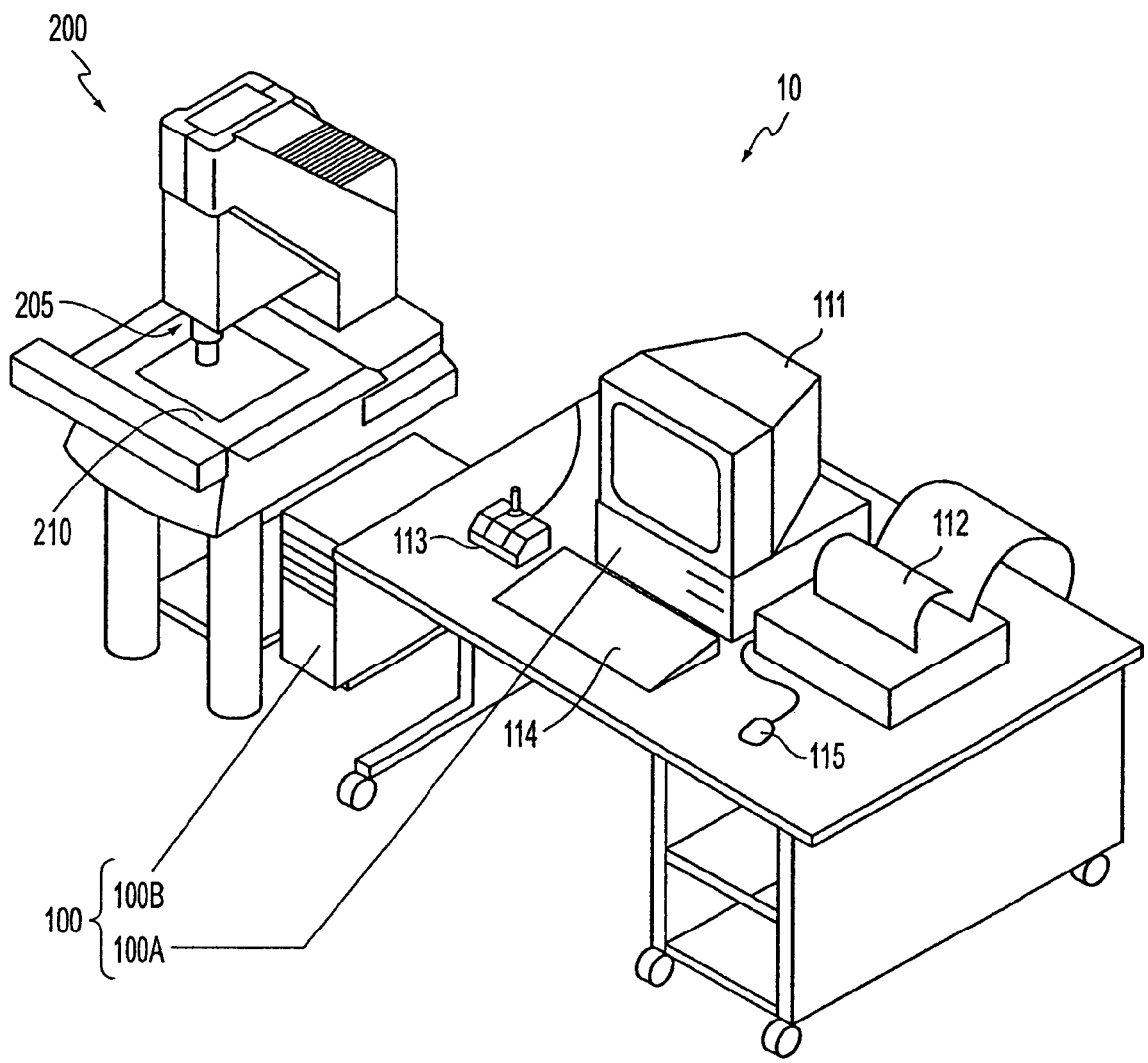
FIG. 1 is a diagram of one exemplary general purpose machine vision and inspection system.

FIG. 1 is a block diagram of one exemplary embodiment of a general purpose programmable machine vision inspection system 10 in accordance with this invention. The machine vision inspection system 10 includes a vision measuring machine 200 that is operably connected to exchange data and control signals with a control system 100. The control system 100 is further operably connected to exchange data and control signals with one or more of a monitor 111, a printer 112, a joystick 113, a keyboard 114, and/or a mouse 115. The vision measuring machine 200 includes a moveable workpiece stage 210 and an optical imaging system 205 which may include a zoom lens or a number of interchangeable lenses. The zoom lens or interchangeable lenses generally provide various magnifications for the images provided by the optical imaging system 205.

The joystick 113 can typically be used to control the movement of the movable workpiece stage 210 in both the X and Y directions, which are generally parallel to the focal planes of the optical imaging system 205, and the movement direction component of the movable optical imaging system 205 in the Z or focus direction. Frequently, the deflection that controls the Z axis is a rotary deflection component of a handle or knob of the joystick 113. The joystick 113 may be provided in a form other than that shown, such as any visual representation or widget on the monitor 111 which is intended to function as a "virtual motion control device" of the machine vision inspection system 10 and is controllable through any computer input device, such as the mouse 115 or the like. Various aspects of the control system 100 and vision measuring machine 200 are substantially similar to those described in more detail in copending and commonly assigned U.S. patent application Ser. No. 10/808,948, filed Mar. 25, 2004, and Ser. No. 10/632,823, filed Aug. 4, 2003, which are hereby incorporated by reference in their entirety.

Figure 2:
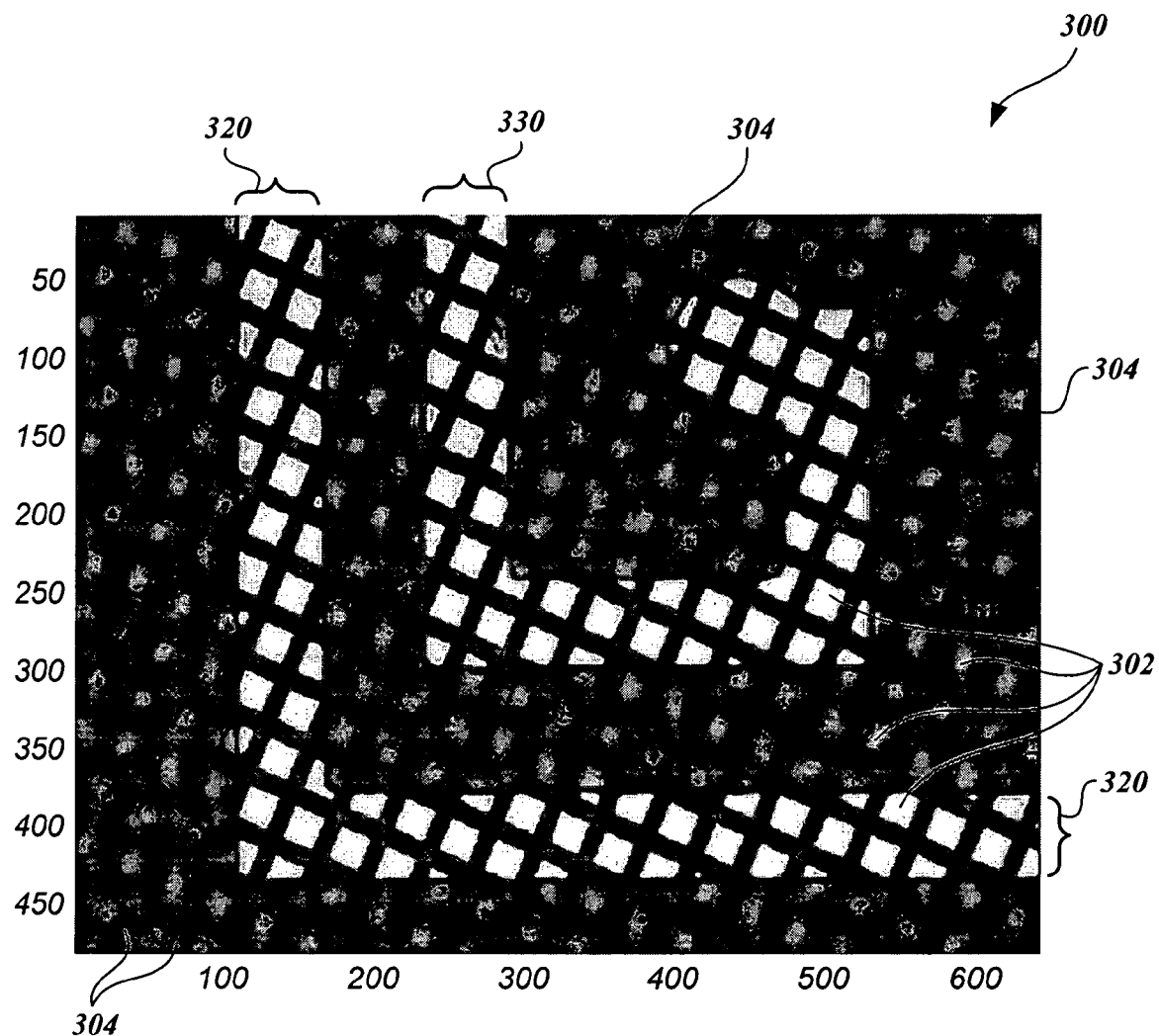
FIG. 2 is a diagram of an exemplary workpiece and feature to be inspected including an occluding grid of a flat panel display screen mask.

FIG. 2 is a diagram of a portion of a display area 300 of a general purpose machine vision inspection system showing an image of an exemplary workpiece and features to be inspected including an occluding grid of a flat panel display screen mask. As shown in FIG. 2, the display area 300 is in a standard 640×480 camera pixel format, and includes an occluding repetitive grid pattern 304 of the flat panel display screen mask. Also beneath the grid 304 is a workpiece background layer 302 which may comprise a substrate, a patterned film, or other surface, and generally includes image information that is the focus of the inspection or measurement process. The objects to be inspected on the workpiece include the traces 320 and 330, which will be described in more detail below. As will also be described in more detail below, the extraneous grid pattern 304 complicates the inspection process in that the grid itself inherently has strong interlaced edge features which complicate the determination and evaluation of the edge portions of the traces 320 and 330.

Figure 3:
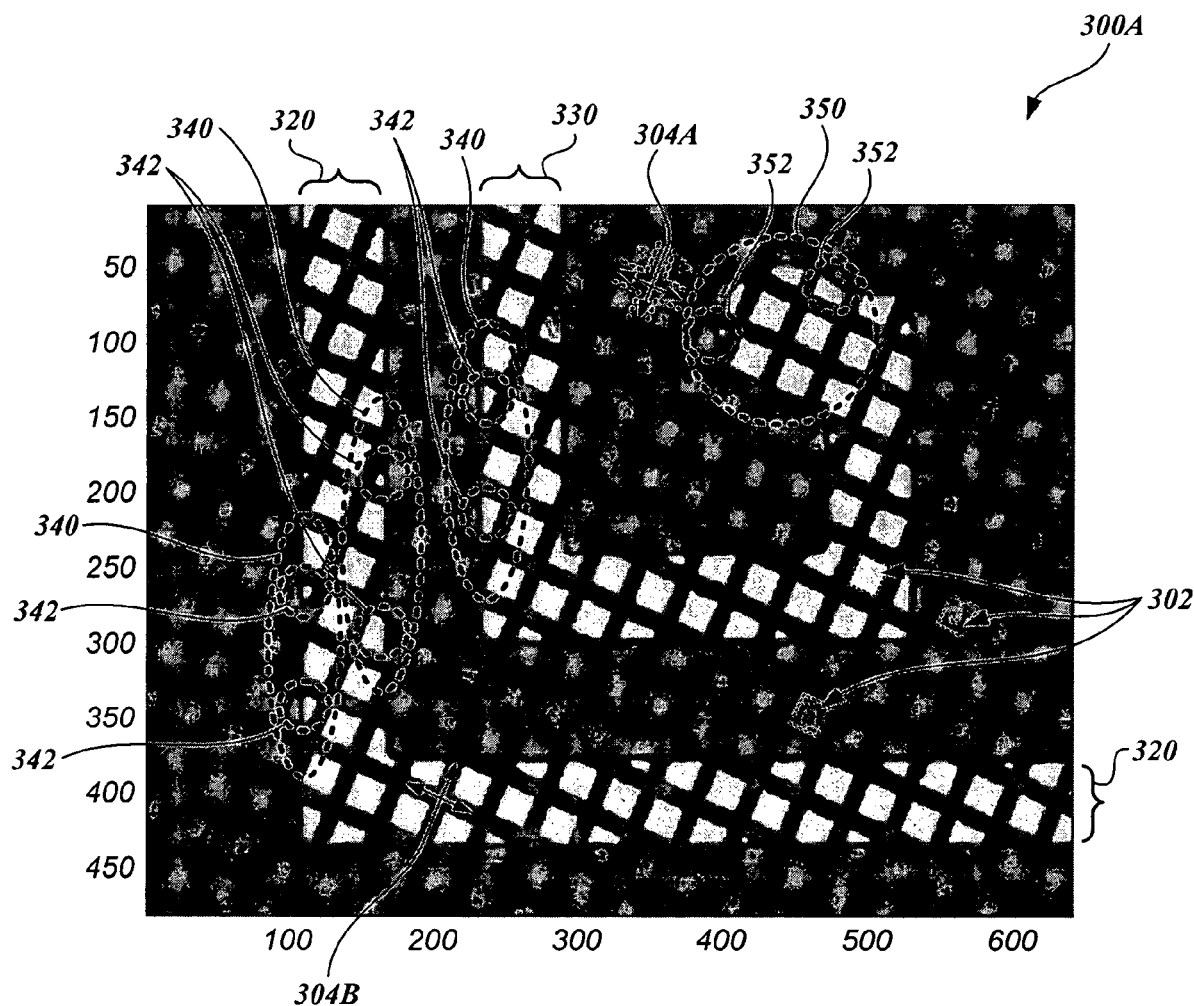
FIG. 3 is a diagram of the exemplary workpiece and feature of FIG. 2 illustrating selected edge portions of the feature.

FIG. 3 is a diagram of a display area 300A showing the exemplary workpiece and features of FIG. 2 illustrating selected edge portions of the features. As shown in FIG. 3, the traces 320 and 330 in the display area 300A have been artificially lightened for purposes of illustration, in order to better emphasize the traces 320 and 330 and their edges. The background layer 302 is visible through open sections of the grid 304. It will be appreciated that while a grid type extraneous occluding object 304 is discussed herein, the methods of the present invention may generally be applied to any type of extraneous foreground or background object. A grid portion 304A is shown to be located over a substrate section of the background layer 302, while another grid portion 304B is shown to be located over a section of the trace 320. A series of large ovals 340 are shown to generally surround edge portions of the traces 320 and 330. The large ovals 340 include smaller circles 342 which emphasize portions of the edge sections of the traces 320 and 330 where their edges are actually visible through the occluding grid 304. A circle 350 is also shown to be surrounding a circular end of the trace 330. The circle 350 includes smaller circles 352 which surround and emphasize edge portions of the trace 330 where the edge is actually visible through the occluding grid 304.

Figure 4:
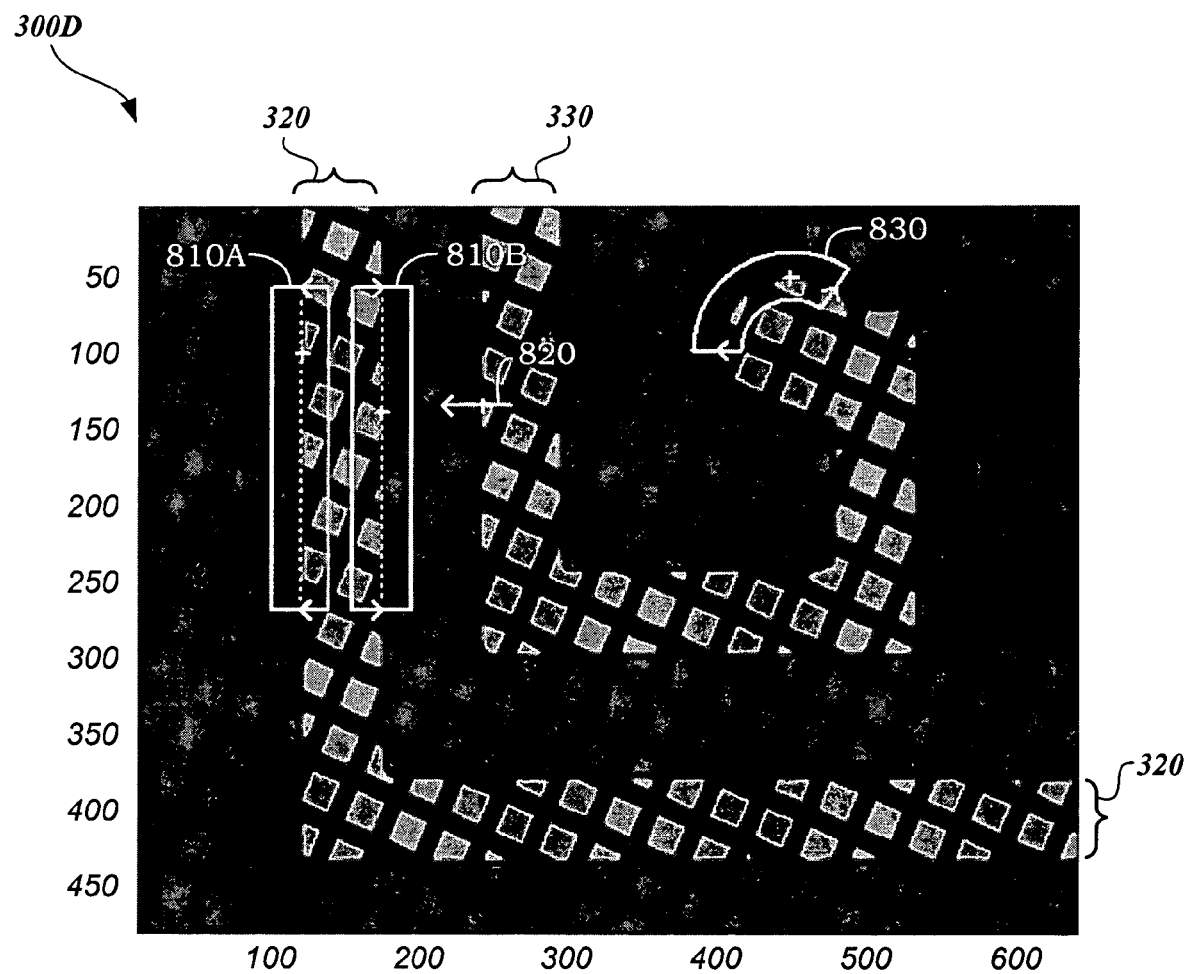
FIG. 4 is a diagram of the exemplary workpiece and feature of FIG. 3 with superimposed exemplary embodiments of GUI widgets representing box, arc, and point tools for edge location.

FIG. 4 is a diagram of a display area 300D which shows the exemplary workpiece and various features to be inspected of FIG. 3 with exemplary embodiments of GUI widgets representing box, arc and point tools for edge location, all usable in various embodiments of the systems and methods according to this invention. As shown in FIG. 4, the display area 300D includes box tool widgets 810A and 810B, a line tool widget 820, and an arc tool widget 830. Various operating characteristics of edge detection tool GUI widgets are generally described in the QVPAK 3D CNC Vision Measuring Machine Users Guide and the QVPAK 3D CNC Vision Measuring Machine Operation Guide, which were previously incorporated herein by reference, and in U.S. patent application Ser. No. 10/903,714, filed Jul. 30, 2004, which is hereby incorporated by reference in its entirety.

The line tool widget 820 may be used directly for determining the location of an edge point in the workpiece image, or may underlie the operation of a box-type edge tool (e.g., box tool widgets 810A and 810B), as described further below. The line tool widget 820 is shown to be located over an edge portion which is located at the left edge of the trace 330. In operation, for inspection purposes, the user may select the line tool widget 820 and drag it across the display to place it over a visible portion of the desired edge of the trace 330. In operation, generally, the line tool 820 then scans over data points (e.g., pixels) along its length with various operations to determine the edge location.

For determining the location of an edge in an image, many algorithms find the edge location by locating the maximum gradient magnitude within the intensity data. If there are multiple gradients along the intensity data, then the location of the selector can help the algorithm determine which gradient corresponds to the desired edge. An indication (e.g., the orientation or direction of the tool 820) can also be provided for helping the algorithm determine whether it should be looking for a rising or a falling edge. Also, in a training mode, various characteristics of the edge are determined and stored, to facilitate an even more reliable selection and determination of the desired edge on a similar part, later, in a run mode. Such characteristics may include the overall valley-to-peak intensity variation surrounding the edge; the nominal intensity value at the edge location; and/or a ratio between these two values, or the like However, it should be appreciated that if the line tool widget 820 is included in an automatic part program that is used to inspect a number of workpieces, that any variation in the location of the occluding grid 304 relative to the trace 330 may locate the occluding grid 304 under the line tool 820, causing it to fail. The present invention is intended to prevent this type of failure mode by filtering out the occluding grid 304. However, it should also be appreciated that in certain embodiments the edge location (the maximum gradient location) is actually found with a sub-pixel level of precision, by finding the interpolated maximum gradient location, using known curve fitting techniques or known centroid finding techniques that identify the centroid of the area under the gradient curve that surrounds the maximum gradient value, or the like. Accordingly, the filtering methods and parameters of this invention have been carefully developed to not significantly alter the location of the edge to be inspected in the filtered image, relative to such levels of precision.

In various exemplary embodiments, the box tool widgets 810A and 810B are displayed as boxes with arrows along the side and a selector in the center. In various exemplary embodiments, the box tool widgets 810A and 810B are sized, positioned and rotated by an operator, until the box is indicative of, or defines, the region of interest, and the "+" edge selector mark is indicative of an edge to be determined and inspected. In various exemplary embodiments, the box tool widgets 810A and 810B generally use one or more conventional edge gradient(s) along the edge in the region of interest, and the edge is determined based on the location of the selector during a manual or training mode of operation and the local magnitudes of the edge gradient(s) along various scan lines, as outlined above for the line tool widget 820. The direction of the arrow defines a reference direction or polarity to be associated with the edge gradient in these various exemplary embodiments. It should be appreciated that the extents of the region of interest indicated by the boundaries of the box tool widgets 810A and 810B are fully adjustable and rotatable, when desired. The arc tool widget 830 also indicates a region of interest, marks a selected edge, and is generally arranged and operated in a manner analogous to the box tool widgets 810A or 810B, in order to determine edge points defining a curve (e.g., a radius) for an image feature.

Figure 5:
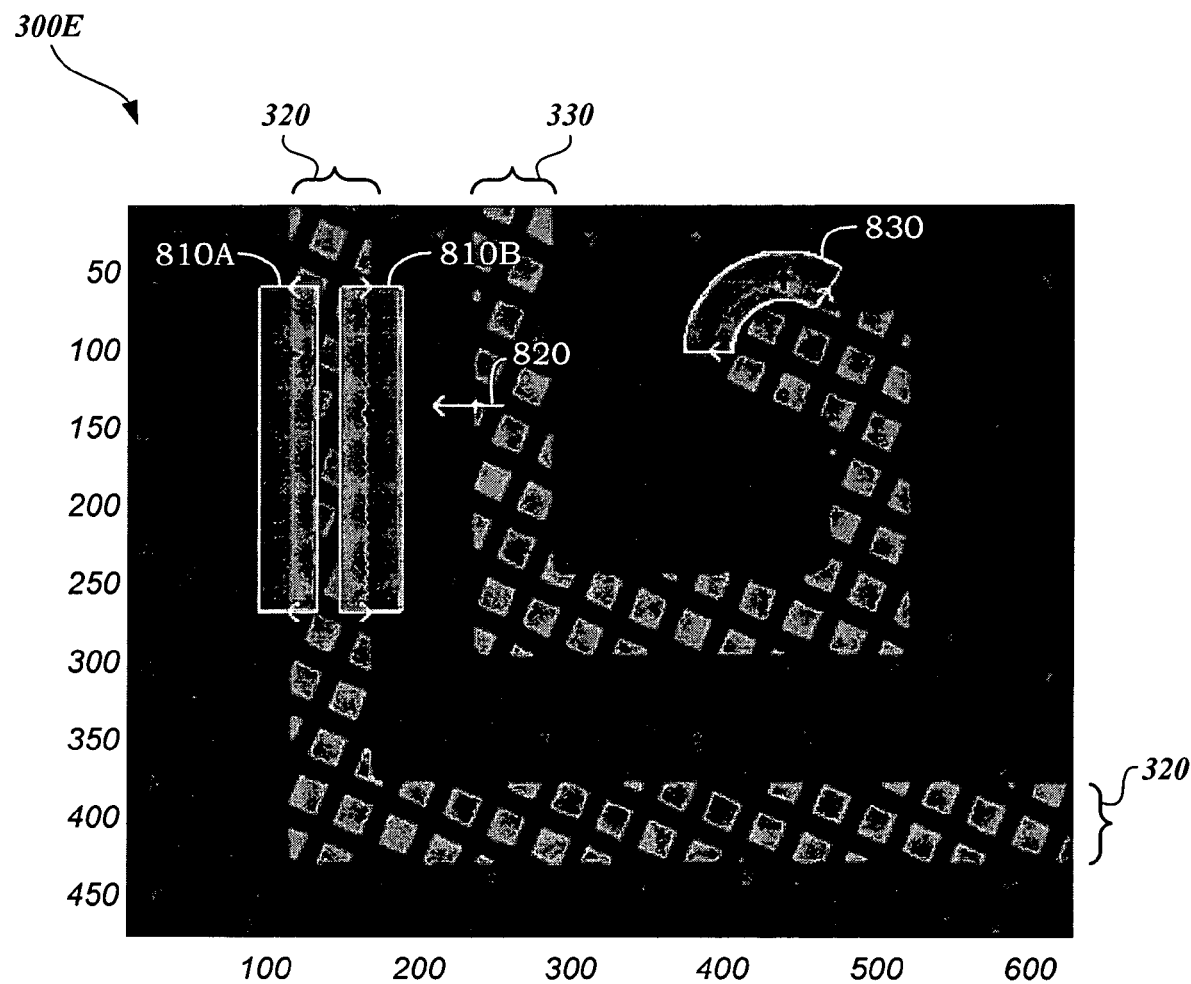
FIG. 5 is a diagram of the exemplary workpiece and feature of FIG. 4 wherein a filtering process has been applied in the region of interests in the box and arc tools.

FIG. 5 is a diagram 300E illustrative of the exemplary workpiece and feature of FIG. 4 wherein a filtering process has been applied in the region of interest of the box and arc tools. As will be described in more detail below, an extraneous feature (e.g., the grid) may be removed from at least a region of interest with image processing algorithms in accordance with the present invention, that is, morphology-based image processing methods, so that measurements can be made on a clean edge image in the region of interest. As illustrated in FIG. 5, within the regions of interest of the box tool widgets 810A and 810B, and the arc tool widget 830, filtering has been applied so as to essentially remove the grid. In various exemplary embodiments, if desired, an image similar to the diagram 300E may be displayed to an operator during a training mode of operation of a machine vision system, so that the operator can qualitatively or quantitatively evaluate the filtered edge image resulting from a set of morphology-based filter parameters, and either accept or modify the filter parameters based on that evaluation.

In various embodiments in accordance with the present invention, a dilation-erosion process is utilized for the filtering of the image. For example, the dilation operations may include assigning each pixel in a structuring element the value corresponding to the maximum pixel value included in the structuring element. Similarly, the erosion operations may include assigning each pixel in a structuring element the value corresponding to the minimum pixel value included in the structuring element. Such image processing operations, as well as various other image processing operations that may be usable to eliminate extraneous feature data in various embodiments according to this invention, are further illustrated and described in numerous image processing publications, for example in *Machine Vision*, by Ramesh Jain, et al., McGraw Hill, 1995, which is incorporated herein by reference in its entirety.

In various embodiments described herein, when "one iteration" of dilation-erosion process is indicated, this corresponds to sequentially stepping a structuring element through each pixel location in a desired region of an image, and performing the previously described dilation operation at each location in the sequence. Then this is followed by sequentially stepping the structuring element through each pixel location in the desired region of the image, and performing the previously described erosion operation at each location in the sequence, to complete one iteration. By analogy, when "K iterations" of dilation-erosion process is indicated, this corresponds to first sequentially stepping a structuring element through each pixel location in a desired region of an image, and performing the previously described dilation operation at each location in the sequence. Then this entire sequence of dilation operations is repeated throughout the desired region an additional number of times until it has been performed a total of "K" times. Then this is followed by sequentially stepping the structuring element through each pixel location in the desired region of the image, and performing the previously described erosion operation at each location in the sequence. Then this entire sequence of erosion operations is repeated throughout the desired region an additional number of times until it also has been performed a total of "K" times. This completes "K iterations" of the dilation-erosion process.

The illustrations and discussion herein assume a relatively lighter (higher pixel value) feature is to be preserved and measured in an image and a relatively darker occluding feature is to be filtered out. Thus, a dilation-erosion process is appropriate. However, it should be understood that if the occluding feature is generally lighter than the features to be preserved and inspected, then according to this invention the dilation-erosion processes described herein will be performed in the reverse order, that is, as erosion-dilation processes, to remove lighter occluding features and preserve darker features to be inspected. In such a case the darker features of interest will be properly preserved, and artifact-free in the sense discussed below with reference to FIGS. 6B and 7B, as desired.

As previously indicated, when the dilation-erosion process is utilized repeatedly, it typically tends to cause the features that are being inspected to adapt to the shape of the structuring element that is used. Hence, applying a square shape on a line feature results in distortion of the line feature (unless the line is oriented in the direction of either of the square axes), and likewise on a circle feature. In order to avoid distortion of a specific feature in an image, in accordance with the present invention, an optimal structuring element has a shape, or a shape and orientation, corresponding to the feature of interest. Thus, for images of lines or rectangles at a given orientation that are to be inspected, the optimal structuring element is a line or rectangle at the same orientation while for images of circles to be inspected, the optimal structuring element is a circle, and so on. Thus, according to this invention a structured morphology approach is utilized wherein the shape, or shape and orientation, of the structuring element is generally selected based on the feature that is to be measured.

Figure 6A:
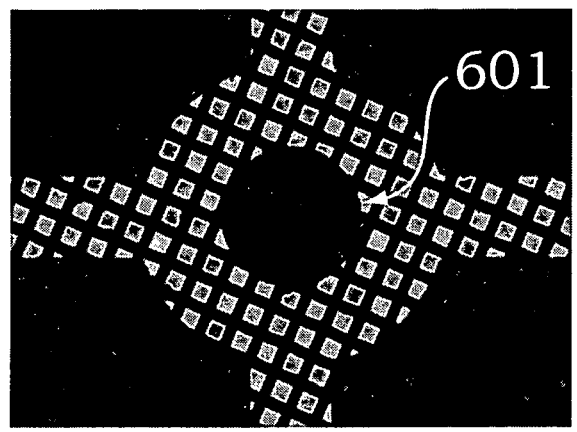
FIGS. 6A-6F are diagrams illustrating various aspects of a filtering process using circular structuring elements as applied to a circular feature.
Figure 6B:
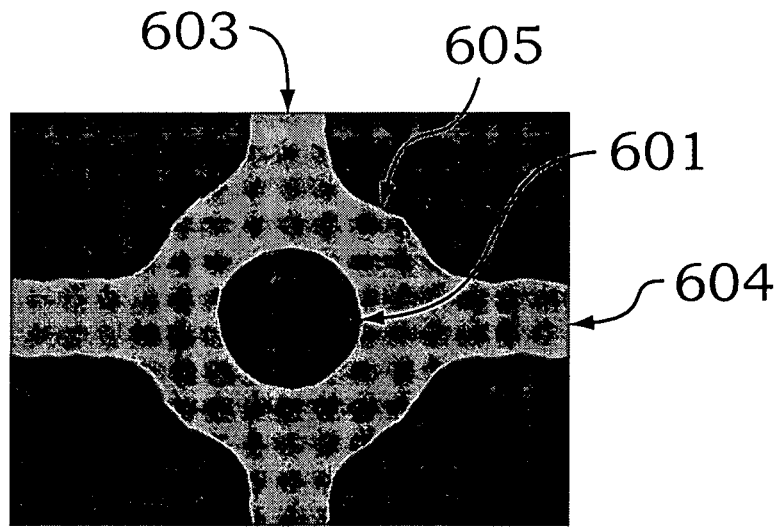
Figure 6C:
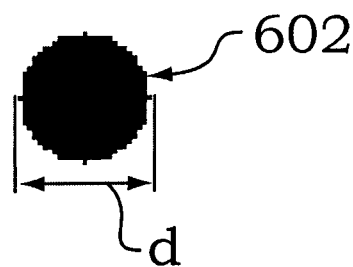
Figure 6D:
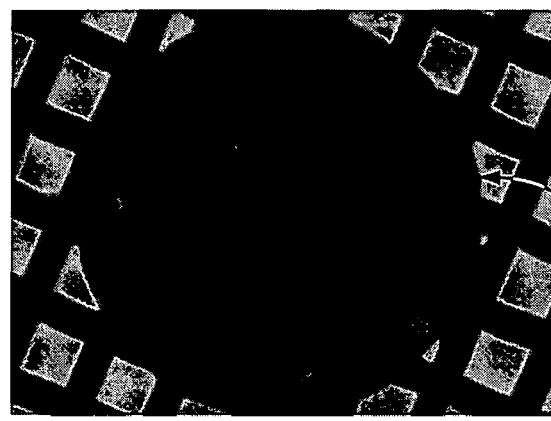
Figure 6E:
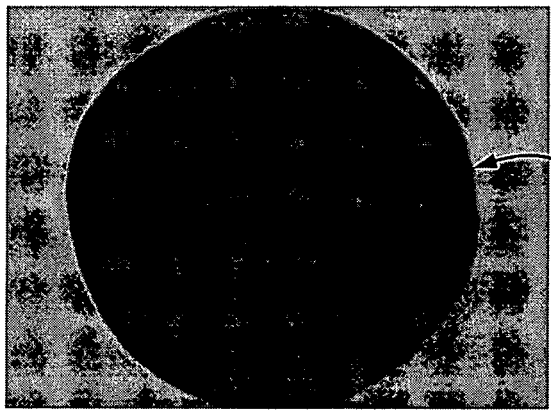
Figure 6F:
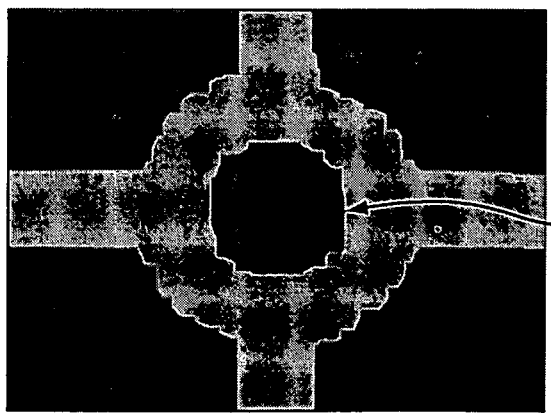

Regarding filtering occluding features from an image to facilitate the measurement of circles, the optimal structuring element is a circular or disk-shaped element of sufficient diameter. FIGS. 6A-6F illustrate various aspects of a morphological filtering process according to this invention that applies a circular structuring element to an image including a circular feature. FIG. 6A shows an image that is 640×480 pixels taken at 5× magnification, which includes a centrally located circular feature 601 that is the feature to be inspected, as well as the surrounding area, all overlain by an occluding grid. When the approximately circular structuring element 602 shown in FIG. 6C is applied to the image shown in FIG. 6A, using a dilation-erosion process according to this invention to remove the occluding grid from the centrally located circular feature 601, the filtered image that is produced is shown in FIG. 6B. Specifically, to produce the result shown in FIG. 6B, a morphological filtering process including five dilation-erosion iterations of the circular structuring element 602, which has a diameter of 27 pixels, was used. As shown in FIG. 6B, the grid has been removed. In particular, the interior of the circular feature 601 is free of the occluding grid and free of filtering artifacts. The revealed circular feature 601 shown in FIG. 6B has its edges at locations that do not vary significantly from those of the occluded circular feature 601 shown in FIG. 6A, which is the desired result. A close-up view (magnified by 15×) of the unfiltered and filtered images of the circular feature 601 are shown in FIGS. 6D and 6E, respectively.

It should be appreciated that the illustrated size of the circular structuring element 602 is exaggerated relative to the scale of the FIGS. 6A and 6B. Generally, for filtering an occluding grid or other occluding feature, the maximum useful dimension d of a structuring element such as the circular structuring element 602 is, at most, somewhat larger than the longest uninterrupted span of pixels included within the grid bars along any direction, as described in greater detail below. Typically, this dimension is smaller than, or significantly smaller than, the diameter of the circular feature to be inspected.

With regard to the area surrounding the revealed circular feature 601, it can be seen in the filtered image of FIG. 6B that the boundaries of the vertical and horizontal arms 603 and 604, and the boundary of the outer circular boundary 605 adjacent to where it intersects with the vertical and horizontal arms 603 and 604, are distorted. As described above, this occurs because when a morphological dilation-erosion filtering process is used, features having shapes different than the structuring element tend to adapt to the shape of the structuring element. In this case, the application of the circular structuring element 601 shown in FIG. 6C to the linear boundaries of the vertical and horizontal arms 603 and 604, and the relatively sharp corners where they intersect with the boundary 605 of outer circular feature, tends to distort the associated edges, which adapt to the shape of the structuring element 601.

Ideally, in order to effectively remove an occluding object such as a grid in a single dilation—rosion iteration in the desired region or region of interest in the vicinity of a feature to be inspected, a structuring element disk diameter must only be large enough to completely cover the relevant span of the occluding feature. For a circular structuring element, the relevant span is generally the longest "uninterrupted" span of occluding feature pixels along any direction, in the desired region or region of interest in the vicinity of the feature to be inspected. However, because the edges of a structuring element "disk" are not truly circular, but only approximated by a set pixels arranged in a row-column format, in some practical cases the image may not be completely or appropriately filtered by morphological filtering using a structuring element of this size. This is particularly true when the diameter of the structuring element is small.

To clarify this point and emphasize the significance of the diameter or size of a disk-shaped structuring element, which, more generally, is representative of the significance of the size of other shapes of structuring elements, consider a hypothetical "disk-shaped" structuring element having a diameter of two pixels. For a row-column arrangement of discrete square pixels, it will be appreciated that a structuring element having a "diameter" of two pixels will, in fact, be a square. As such, when applied to filter an image containing a circular feature, the boundaries of the circular feature will typically exhibit artifacts introduced by the disparate shape of the crude structuring element. This effect is shown, for example, in FIG. 6E. Specifically, to produce the result shown in FIG. 6E, a morphological filtering process including 27 dilation-erosion iterations of a square structuring element having a size of 3×3 pixels was used. As shown in FIG. 6E, the grid has been removed, but the revealed circular feature 601' includes edge artifacts that result in irregular edges that include edge locations that vary significantly from the actual edge locations defined by the occluded circular feature 601 shown in FIG. 6A. This is not an acceptable filtering result when relatively high accuracy inspection and measurement results are desired, and emphasizes the value of selecting a structuring element according to this invention, such that it has a shape that reasonably approximates the shape of the feature to be inspected.

In various embodiments or applications, the fastest filtering operations may result from using structuring elements that have dimensions significantly less than the relevant span length, and increasing the number of iterations as required to achieve the desired filtering result. For example, in theory, if d' is the diameter of a circular structuring element that is required to completely filter out or remove a grid or other occluding feature in a single iteration under ideal or noise-free conditions, a structuring element of diameter d would achieve approximately the same filtering result in $N=d'/d$ iterations under ideal conditions. However, in practice, as indicated by the poor results shown in FIG. 6F for a "too small" 3×3 structuring element, it is desirable to restrict a circular structuring element to have a dimension d that is large enough to allow a set pixels arranged along rows and columns to approximate a circle with adequate resolution to provide accurate filtering. More generally, structuring elements having other shapes should also have dimensions that fulfill this criteria. Generally, as the dimension(s) of a structuring element is (are) increased, the shape of it's curved edges and/or corners may be more closely approximated by a set of discrete pixels in a row-column arrangement. In order to overcome the previously described effects, and additionally to provide filtering that overcomes potential filtering deficiencies caused by noise in real images, in various embodiments where it is desired to provide an adequate approximation of an disk-shaped or circular structuring element, the diameter is restricted to be at least 7 pixels. For a better and more reliable approximation of a disk, the disk diameter is at least 13 pixels, and for an even better and more reliable approximation of a disk, the disk diameter is at least 17 pixels. In addition, when the occluding feature to be filtered out is a grid having a bar width or thickness T, in various embodiments it is convenient to set the disk diameter d to be at least as large as a minimum allowed value as outlined above, or to provide a simple and adequate default value, approximately as large as $d=2T+1$, whichever is larger, in order to provide a reasonable tradeoff between filtering speed and reliable and complete filtering.

In various embodiments, to avoid introducing a spatial shift or bias in the apparent location of various filtered image features and provide the best filtering accuracy, it is advantageous if the structuring element diameter corresponds to an odd number of pixels. In such cases the pixels of the structuring element are symmetrically distributed about the center pixel of the structuring element, and the central pixel unambiguously corresponds to each current pixel address location when filtering operations are performed at various pixel address locations in the region of interest (or image) during an iteration. Providing structuring elements that are symmetrical about a central pixel is particularly important if the diameter or length of a structuring element is small.

Regarding the number of iterations used for a morphological filtering operation, the number of iterations may be determined to be somewhat larger than the minimum number of iterations $N=d'/d$ iterations that are required under ideal conditions as outlined above. As one alternative, under realistic imaging conditions that include noise, etc., N+3 iterations may be used to insure reliable filtering results. As an alternative to actively determining a number of iterations based on the minimum number of iterations required for a particular feature, the dimension(s) of a structuring element may simply be set to a predetermined default value, and the number of iterations set to a corresponding predetermined default value that assures complete filtering. For example, when the occluding feature is a grid having a bar width or thickness T and the structuring element dimension is set to a default value of $d=2T+1$, then the number of iterations may simply be set to a default value of 5 iterations, which is a conservatively "increased" value that insures effective filtering even for noisy images while maintaining a reasonable filtering speed. It should be noted that in some cases, even when an occluding feature, for example a grid, has been completely removed, the boundaries of a feature of interest may not be smooth. In such cases, the number of iterations can be increased to give smoother boundaries.

Figure 7A:
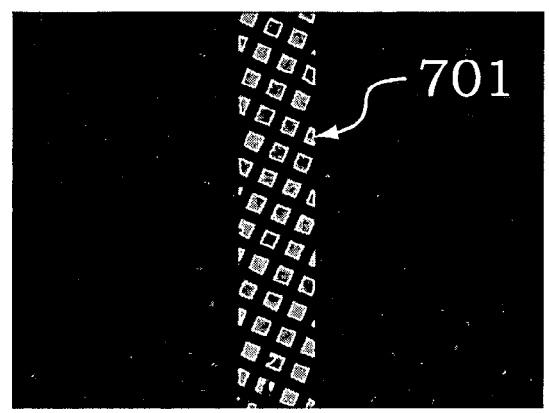
FIGS. 7A-7D are diagrams illustrating various aspects of a filtering process using a linear-type rectangular structuring element as applied to a linear feature.
Figure 7B:
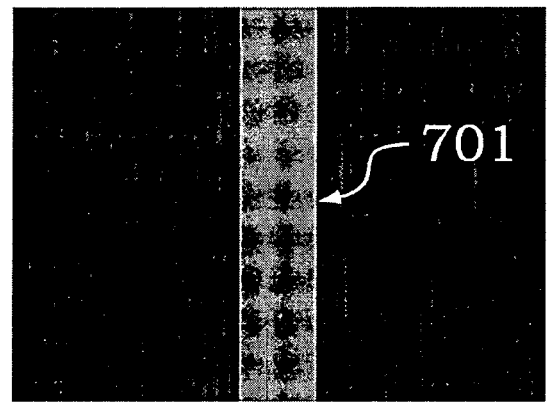
Figure 7C:
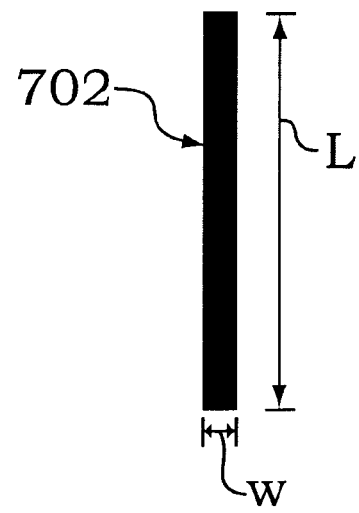

Regarding filtering occluding features from an image to facilitate the measurement of a rectangular feature and/or a straight edge, the optimal structuring element is a linear-type element, that is, a linear or rectangular element of sufficient length and width. FIGS. 7A-7C illustrate various aspects of a morphological filtering process according to this invention that applies a linear structuring element to an image including a linear feature. FIG. 7A shows an image that is 640×480 pixels taken at 5× magnification, which includes a centrally located linear feature 701 that is the feature to be inspected, as well as the surrounding area, all overlain by an occluding grid. When an approximately linear structuring element similar to the linear structuring element 702 shown in FIG. 7C is applied to the image shown in FIG. 7A, using a dilation-erosion process according to this invention to remove the occluding grid from the centrally located linear feature 701, the filtered image that is produced is shown in FIG. 7B. Specifically, to produce the result shown in FIG. 7B, a morphological filtering process including 5 dilation-erosion iterations of a linear structuring element oriented parallel to the edges of the linear feature 701 and having a length of L=27 pixels and a width of w=1 pixels, as used. As shown in FIG. 7B, the revealed linear feature 701 shown in FIG. 7B has the occluding grid completely removed from its interior, which constitutes a sufficient or complete removal of the occluding feature for the purposes of this invention, and the locations of the edges of the revealed linear feature 701 shown in FIG. 7B do not vary significantly from those of the occluded linear feature 701 shown in FIG. 7A, which is the desired result. It should be appreciated that the periodically distributed jagged-line artifacts in the regions surrounding the rectangular feature need not disturb detection and measurement of the desired edges of the revealed linear feature 701. As illustrated in FIG. 7B, the dilation-erosion process according to this invention preserves the feature to be inspected such that its interior is free of occluding features and artifacts. Therefore, the desired edge of the preserved feature may be reliably found simply by orienting the scan direction (indicated by the direction of the arrow heads in the various video tools shown in FIG. 5) of an edge detection video tool to begin scanning from the interior of the preserved feature. The first edge encountered will thus be the desired edge. Accordingly, in various exemplary embodiments according to this invention, when a morphological filter according to this invention is applied for an inspection operation, the scan direction of the associated edge detection tool(s) is determined manually, semi-automatically, or automatically, such that it begins in the interior of the feature to be inspected. Alternatively, when inspection operations are defined it is conventional to use the "+"-shaped edge selector previously described with reference to the various video tools shown in FIG. 4 and FIG. 5 to effectively discriminate the desired edge to be inspected from adjacent edges, such as the edges of the jagged line artifacts. However, this method of detecting only the desired edge is not as reliable as the previously described scan direction technique. Of course the two methods may be used in conjunction, to provide enhanced robustness.

It should be appreciated that the illustrated size of the linear structuring element 702 is exaggerated relative to the scale of the FIGS. 7A and 7B. The dimension w of the rectangular structuring element 701 is generally determined to be smaller or significantly smaller than the width of the feature having the edges(s) to be inspected. In particular, in various applications where it is assured that the edge(s) of an occluding element (such as the edges of occluding grid bars) will not be parallel to the edge of the feature to be inspected, and that a rectangular or linear structuring element can be consistently aligned at least approximately parallel to the edge(s) to be detected, it is sufficient if the dimension w of the rectangular or linear structuring element is at least 1 pixel. However, in the particular case where the edge(s) of an occluding element (such as the edges of occluding grid bars) are substantially parallel to the edge of the feature to be inspected, it is not possible to get rid of the occluding feature along the direction parallel to linear structuring element that has a width w=1 pixel. However, a simple solution in such cases is to use a rectangular structuring element, for example, having a thickness or width dimension w of 3 pixels or more. Thus, in various exemplary embodiments, at least when the edge(s) of an occluding element are parallel, or nearly parallel, to the edge of the feature to be inspected, linear-type structuring elements used in part programs incorporating the methods of this invention have a width w of at least 3 pixels. This insures that even "parallel" occluding elements are eliminated from the interior of the feature to be inspected.

Regarding the length dimension L, ideally, in order to effectively remove an occluding object such as a grid in a single dilation-erosion iteration in the desired region or region of interest in the vicinity of a feature to be inspected, the length L must only be long enough to completely cover the relevant span of the occluding feature. Assuming that the structuring element is oriented approximately parallel to edges of the linear-type feature to be inspected, the relevant span is the longest uninterrupted span of pixels included in an occluding feature along a direction that is parallel to the orientation of the edges of the linear-type feature to be inspected, in the desired region or region of interest in the vicinity of the feature to be inspected.

In various embodiments or applications, the fastest filtering operations may result from using structuring elements that have a length significantly less than the relevant span length, and increasing the number of iterations as required to achieve the desired filtering result. For example, in theory, if L' is the length of a linear-type structuring element that is required to completely filter out or remove a grid or other occluding feature in a single iteration, a structuring element of length L'/N would achieve approximately the same result in N iterations. Despite the increased number of iterations, due to the smaller size of the structuring element, such embodiments may actually perform the required multiple-iteration filtering operations in less time than it takes to perform the aforementioned one-iteration filtering operations using the relatively longer structuring element.

However, according to other considerations, in some embodiments or applications the dimension L may be restricted to have a default length that is sufficient to insure that the linear-type structuring element can be oriented with a desired angular resolution and accuracy. In contrast to a circular structuring element, which has no apparent orientation, morphological structuring element shapes that have straight sides, and specifically linear-type structuring elements such as rectangular and linear elements must be appropriately oriented relative to the straight edges of the feature to be inspected in order to produce the desired accurate filtering results. Generally, the closer the axis of a linear-type structuring element is to being parallel to an edge feature to be inspected, the more accurately the filtering will preserve the edge straightness and location, and the more accurate the subsequent inspection and measurement results with be.

Figure 7D:
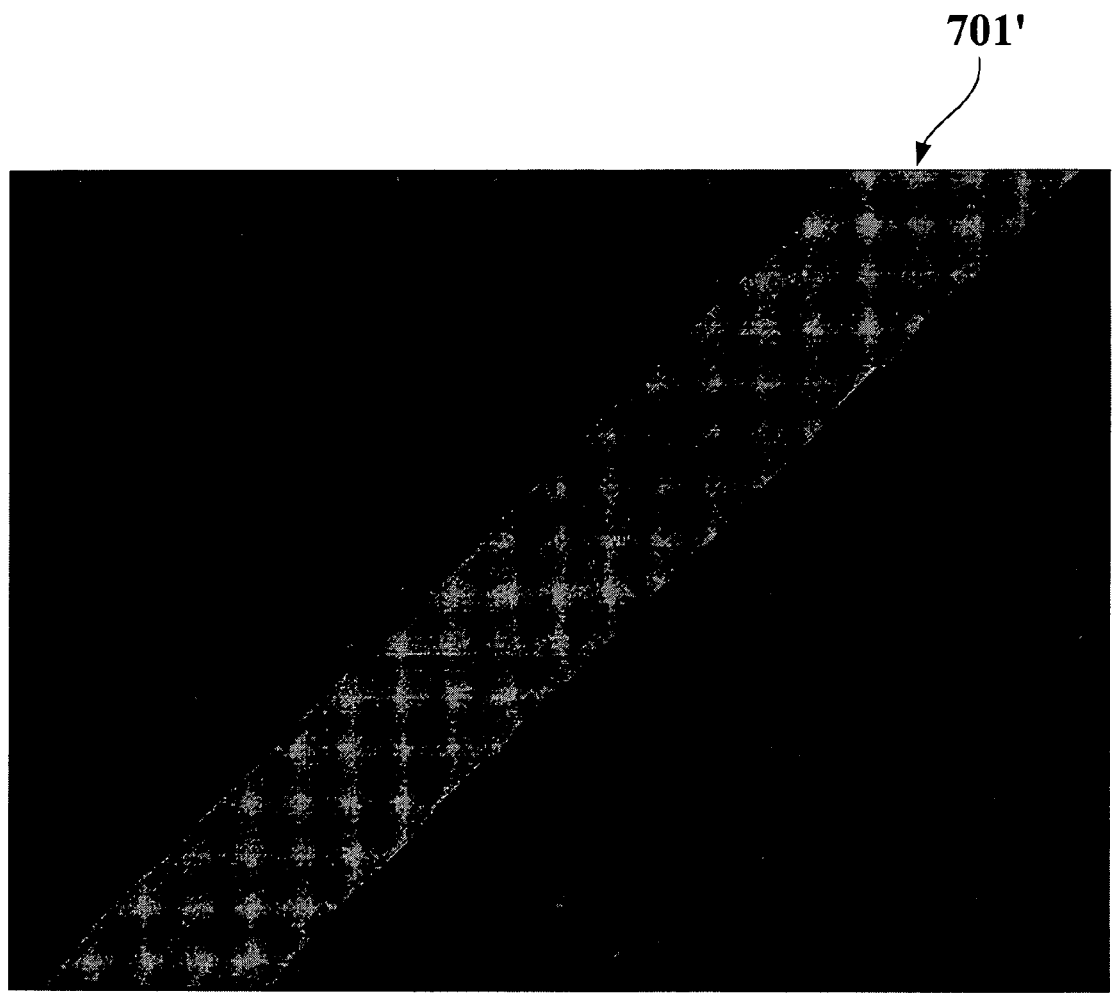

To clarify the significance of the length of the structuring element in this regard, consider a structuring element having a length of two pixels. For a row-column arrangement of structuring element pixels, it will be appreciated that a structuring element having a length of two pixels and a width of one pixel has meaningful angular orientations of only 0°, 45°, and 90°. That is, the only choice for two adjacent pixels is either along one row, one column, or along a diagonal. Thus, the meaningful angular orientation resolution is only 45°. Generally, as the length of the structuring element is increased, the meaningful angular orientation resolution improves. For example, when the structuring element has a length of approximately 58 pixels a meaningful angular orientation resolution of approximately 1° can be provided. The (ideally) linear edges of a linear feature to be inspected will typically exhibit artifacts introduced by a linear structuring element that is not parallel to the edges. This effect is shown, for example, in FIG. 7D. Specifically, to produce the result shown in FIG. 7D, a morphological filtering process including 5 dilation-erosion iterations of a rectangular/linear structuring element having a length of L=27 pixels and a width of w=1 pixels, was used. The linear structuring element was misaligned relative to the edges of the linear feature to be inspected by 2°. As shown in FIG. 7D, the grid has been removed, but the revealed linear feature 701' includes edge artifacts that result in irregular edges. This is not an acceptable filtering result when relatively high accuracy inspection and measurement results are desired. This example emphasizes the value of properly orienting a structuring element to provide morphological filtering according to this invention, which in the case of a linear-type structuring element requires it to have a length that allows it to be oriented parallel to an edge to be inspected with sufficient angular resolution. Of course, the accuracy requirements for a particular inspection measurement determines the required angular resolution for orienting structuring element, which in turn determines the required structuring element length. Accordingly, relatively shorter structuring elements are allowed when the required inspection accuracy is relatively lower. Thus, in various embodiments where it is desired to provide at least 1° of meaningful angular orientation resolution for a structuring element that has at least one linear edge, the linear edge has a length of at least 58 pixels. Similarly, in embodiments where relatively less accuracy is acceptable, for a respective angular orientations of 2°, 5° or 10°, at least one linear edge has a length of 29 pixels, 12 pixels, or 6 pixels, respectively. More generally, to provide an angular resolution of approximately K°, at least one linear edge has a length of $[180°/(\pi* K°)]$ pixels. Various considerations and methods related to manually, semi-automatically, or automatically selecting or adjusting the orientation and/or length for a linear or rectangular structuring element, are outlined in greater detail below.

Regarding the maximum length L of a linear-type structuring element, hypothetically, if one wants to cleanly remove an occluding feature such as a grid in one iteration, the linear structuring element would need to be of sufficient length L such that it completely spans the broadest uninterrupted span of pixels included in the occluding feature along a direction that is parallel to the orientation of the edges of the linear feature to be inspected, in order to cleanly remove the occluding feature. In the case of an occluding grid, this line length L may be calculated according to the following process, described with reference to FIG. 8.

Figure 8:
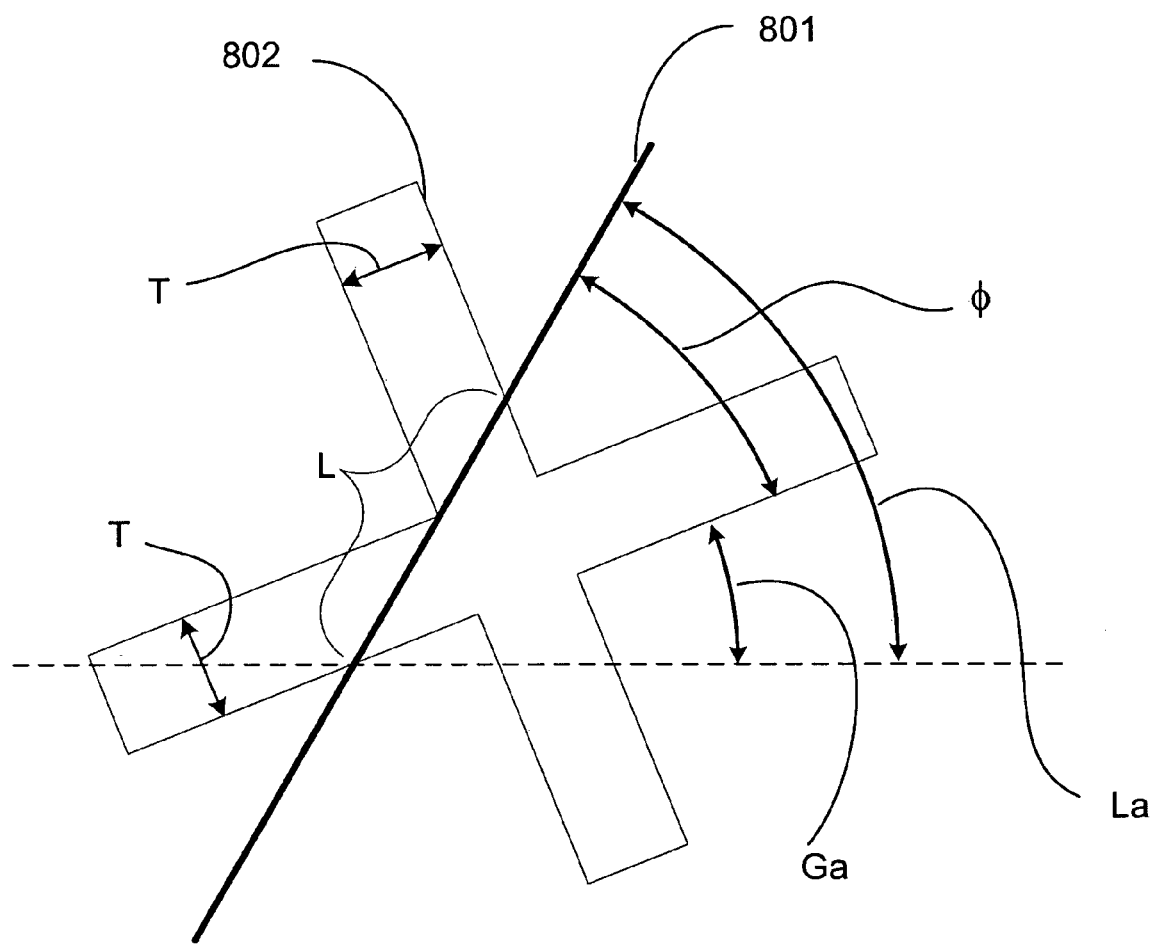
FIG. 8 is a diagram illustrating various parameters usable to determine a length of a linear type structuring element as applied to remove an extraneous grid feature.

FIG. 8 schematically shows a line or edge feature 801 to be inspected and a portion of an extraneous occluding grid 802. Let Ga denote the grid orientation angle (from a reference axis), T denote the grid bar width or thickness, and La denote the orientation (relative to the reference axis) of the line or edge feature 801 to be inspected. According to this invention, La is also the ideal orientation of the associated structuring element. Let $\phi=(La-Ga)$ denote the orientation of the line or edge feature 801, or the associated structuring element, relative to the grid. As illustrated in FIG. 8, the longest uninterrupted span of pixels included in the occluding grid 802 along a direction parallel to the direction of the line or edge feature 801 or the structuring element, is along a line internal to the grid bars that just grazes a corner where the grid bars intersect. The length L of the uninterrupted span of grid pixels along this line is nominally:

$$L = T\left(\frac{1}{\sin\phi} + \frac{1}{\cos\phi}\right) \qquad \text{EQ. 1}$$

According to this equation, when the line orientation and the grid orientation are aligned, that is when $\phi=0°$, 90°, 180°, or 270°, the length L is theoretically infinite. However, regardless of whether the occluding feature is a grid or another type of object, in practice the maximum useful value of L is certainly no more than the longest dimension included in a region to be filtered. In various embodiments or applications, only a current region of interest defined in association with a current individual video tool is filtered, in which case the maximum useful value of the dimension L is certainly no more than approximately the diagonal dimension of a current region of interest. In embodiments or applications where an entire image is filtered, the maximum useful value of the dimension L is certainly no more than approximately the diagonal dimension of the image. If such relatively long lengths are used for the structuring element and the filtering operations are performed at various pixel address locations in the region of interest (or image) during an iteration, the portions of the structuring element that extend beyond the region of interest (or image) in relation to a particular pixel address may be ignored.

However, for many occluding grid arrangements, the value of L determined according to EQUATION 1 will be less than the diagonal dimensions described above. In such cases, a valuable purpose for obtaining a value of L determined according to EQUATION 1 for a particular feature or image is to determine whether that value of L for that particular feature or image is less than the previously described diagonal dimension(s), or some other default maximum structuring element length that is applied in a particular embodiment or application. That is, for an occluding grid, a structuring element length greater than that determined according to EQUATION 1 is not likely to significantly improve the image filtering results in relatively noise-free images, but it will result in relatively slower filtering operations. Thus, in various embodiments, in order to ensure that filtering operations do not take longer than necessary to produce the desired filtering result, the structuring element length is limited to be approximately equal to, or less than, the relevant span length, which may be determined as outline above. As previously indicated, if the structuring element length is less than the relevant span length, multiple dilation-erosion iterations are required in order to reliably remove the occluding feature. In theory, if L' is the length of a linear-type structuring element that can completely filter out or remove a grid or other occluding feature in a single iteration under ideal conditions (e.g., noise-free conditions), a number of iterations N=L'/L would achieve approximately the same result for a structuring element of length L, under ideal conditions.

Similarly to considerations previously discussed with reference to the circular structuring element, when the occluding feature is a grid having a bar width or thickness T, in various embodiments it is convenient to set the length of a linear-type structuring element as outlined above with reference to EQUATION 1, or to provide a simple and adequate default value, approximately as large as L=2T+1, whichever is larger, in order to provide a reasonable tradeoff between filtering speed and reliable and complete filtering. Furthermore, in various embodiments, to avoid introducing a spatial shift or bias in the apparent location of various filtered image features and provide the best filtering accuracy, it is advantageous if a linear-type structuring element length L corresponds to an odd number of pixels, for reasons previously described. Furthermore, the number of iterations used for a morphological filtering operation using a linear-type structuring element may be determined to be somewhat larger than the minimum number of iterations N=L'/L iterations that are required under ideal conditions as outlined above. For example, as one alternative, N+3 iterations may be used to insure reliable filtering results. Alternatively, for some applications and/or features, the length of a linear-type structuring element and the corresponding number of iterations may simply be set to predetermined default values that assures complete filtering. For example, for an occluding grid having a bar width or thickness T, when the structuring element length is set to a default value of d=2T+1, then the number of iterations may simply be set to a default value of 5 iterations, which is a conservatively "large" value that insures effective filtering for a region of interest in most or all typical images, including noisy images, while maintaining a reasonable filtering speed.

In various implementations, any or all of the characteristics governing the selection of the structuring element, and the number of iterations for which it is applied, may be determined manually, semi-automatically, or automatically during a "learn mode" or training phase that determines various parameters and instructions to be included in a part program for a workpiece. The part program may be recorded and later recalled and executed automatically during a run mode of operation or a run phase, to inspect the workpiece. For example, in various applications such characteristics may include, but are not limited to, an extraneous grid thickness and/or orientation, the relevant dimension(s) of an extraneous grid, or other occluding feature, the orientation of a linear feature to be filtered and inspected, a region of interest dimension, etc.

Using the systems and methods disclosed herein, position accuracies that have been obtained by experiment for edge features occluded by grids, such as those shown in the various figures included herein, are in the range of 0-1 µm, and for the diameter of similarly occluded circles have been in the range of 1-2.5 µm. Experimental measurement repeatability of less than <0.1µ has been achieved. These errors are up to 50-75% smaller than those obtain by using a generic filtering method for the same images. Thus, it will be appreciated that morphological filtering systems and methods according to this invention can be used to provide specifically-filtered images or image portions that can be used in conjunction with existing machine vision inspection system video tools to measure occluded features with micron and sub-micron accuracy and repeatability, a level of accuracy and repeatability which has not been attained by less sophisticated or comprehensive filtering methods.

Figure 9:
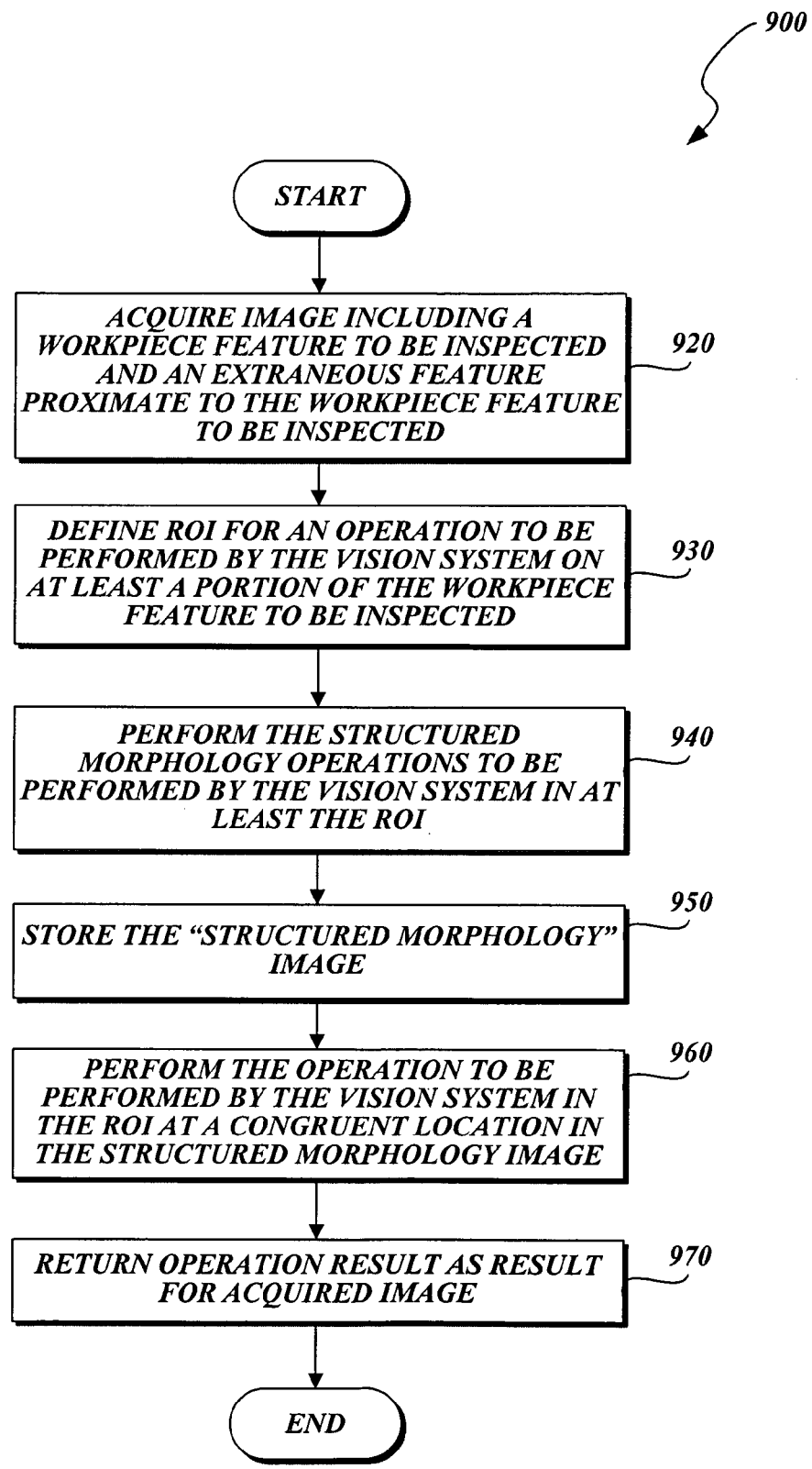
FIG. 9 is a flow diagram illustrative of one exemplary embodiment of a routine for inspecting a workpiece with an extraneous feature.

FIG. 9 is a flow diagram illustrative of one exemplary embodiment of a general routine 900 for inspecting a workpiece with an extraneous feature. At a block 920, an image is acquired, including a workpiece feature to be inspected and an extraneous feature (e.g., a grid) proximate to the feature to be inspected. At a block 930, a region of interest is defined for an operation to be performed by the vision system on at least a portion of the image including the workpiece feature to be inspected. At a block 940, the structured morphology operations that are to be performed by the vision system in at least the region of interest are performed. At a block 950, the structured morphology image is stored. At a block 960, the operation to be performed by the vision system in the region of interest is performed at a congruent location in the structured morphology image. At a block 970, the operation result is returned as a result for the acquired image. The operations of the routine 900 may be performed in a manual mode in order to perform manual workpiece inspection operations. In other instances, they may be performed in a learn mode/training mode manually, semi-automatically, or automatically in order to define an inspection procedure including morphological filtering operations to be recorded in a part program. In yet other instances, they may be performed during the automatic execution of a part program that includes a set of workpiece inspection instructions that include morphological filtering operations.

Figure 10:
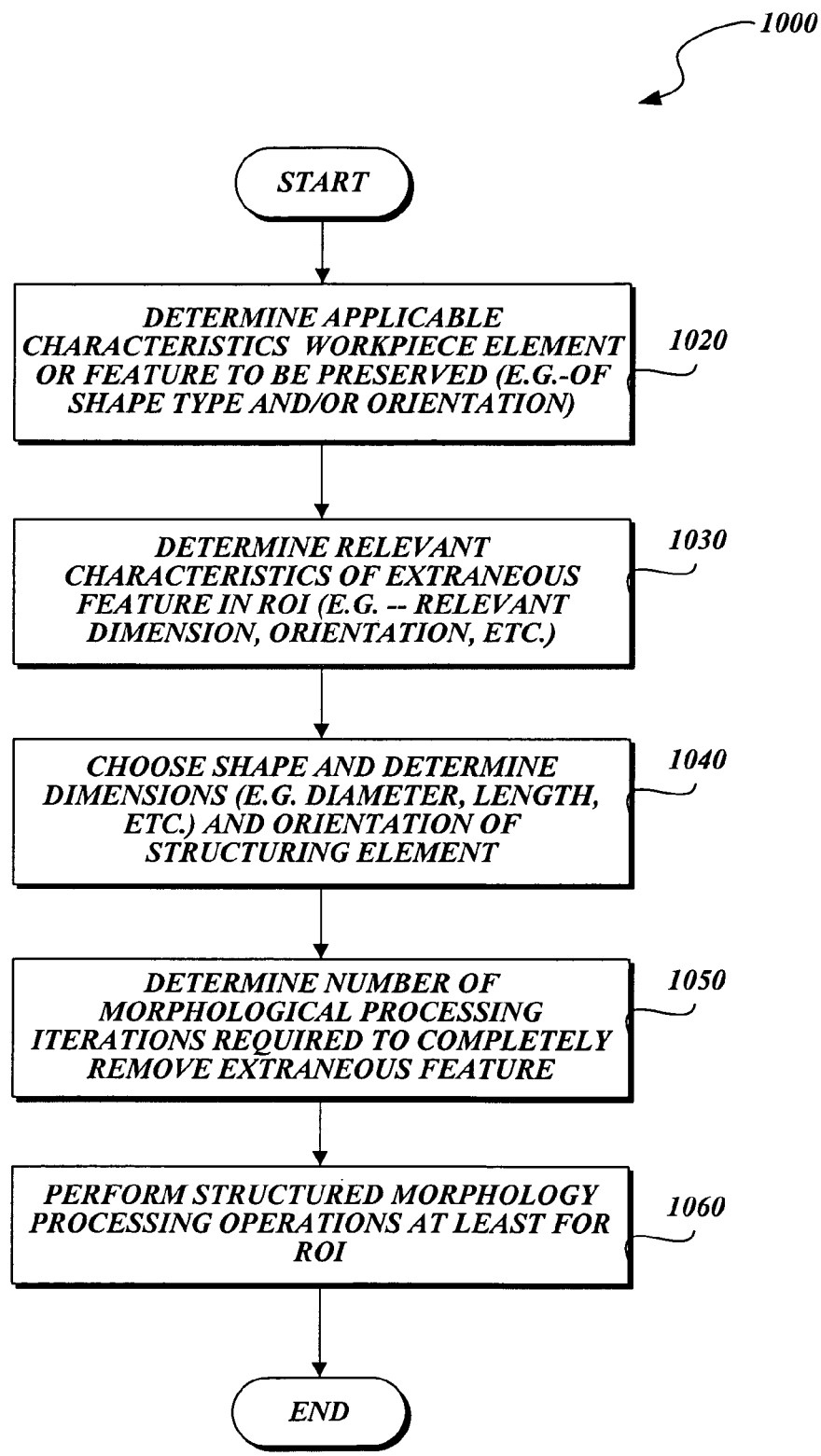
FIG. 10 is a flow diagram illustrative of one exemplary embodiment of a routine for determining a structuring element and performing structured morphology operations.

FIG. 10 is a flow diagram illustrative of one exemplary embodiment of a routine 1000 for performing structured morphology operations. In one embodiment, the structured morphology operations of FIG. 10 may be performed at block 940 of FIG. 9. As shown in FIG. 10, at a block 1020, the applicable characteristics of the shape and/or orientation of the workpiece element or feature to be inspected in the region of interest are determined. At a block 1030, the applicable characteristics of the extraneous feature in the region of interest are determined (e.g., grid width or thickness, orientation, relevant dimension, etc.). At a block 1040, the shape, orientation and dimensions of the structuring element are determined (e.g., the diameter, length, width or thickness, etc.) based on information obtained in the operations of blocks 1020 and 1030. In various embodiments, the determination of the orientation and/or dimensions at the block 1040 may also take into account any operational default limits that are applicable to the orientation and/or dimensions. Various examples of such default limits have been previously described.

At a block 1050, the number of morphological processing iterations that are required to remove the extraneous feature, at least from the interior of the feature to be inspected, are determined based on previously obtained information. In various embodiments, the determination of the number of iterations may be based on information obtained in the operations of one or both of the blocks 1020 and 1030. In various embodiments, determination of the number of iterations may also take into account an operational default number of iterations, which may be associated with a default dimension previously determined in block 1040, for example. Various examples of determining feature-specific and/or default number of iterations, have been previously described. At a block 1060, the desired morphological processing operations are performed at least on the region of interest, based on the determined structuring element and number of iterations. Following the operations of block 1060, the routine ends.

Figure 11:
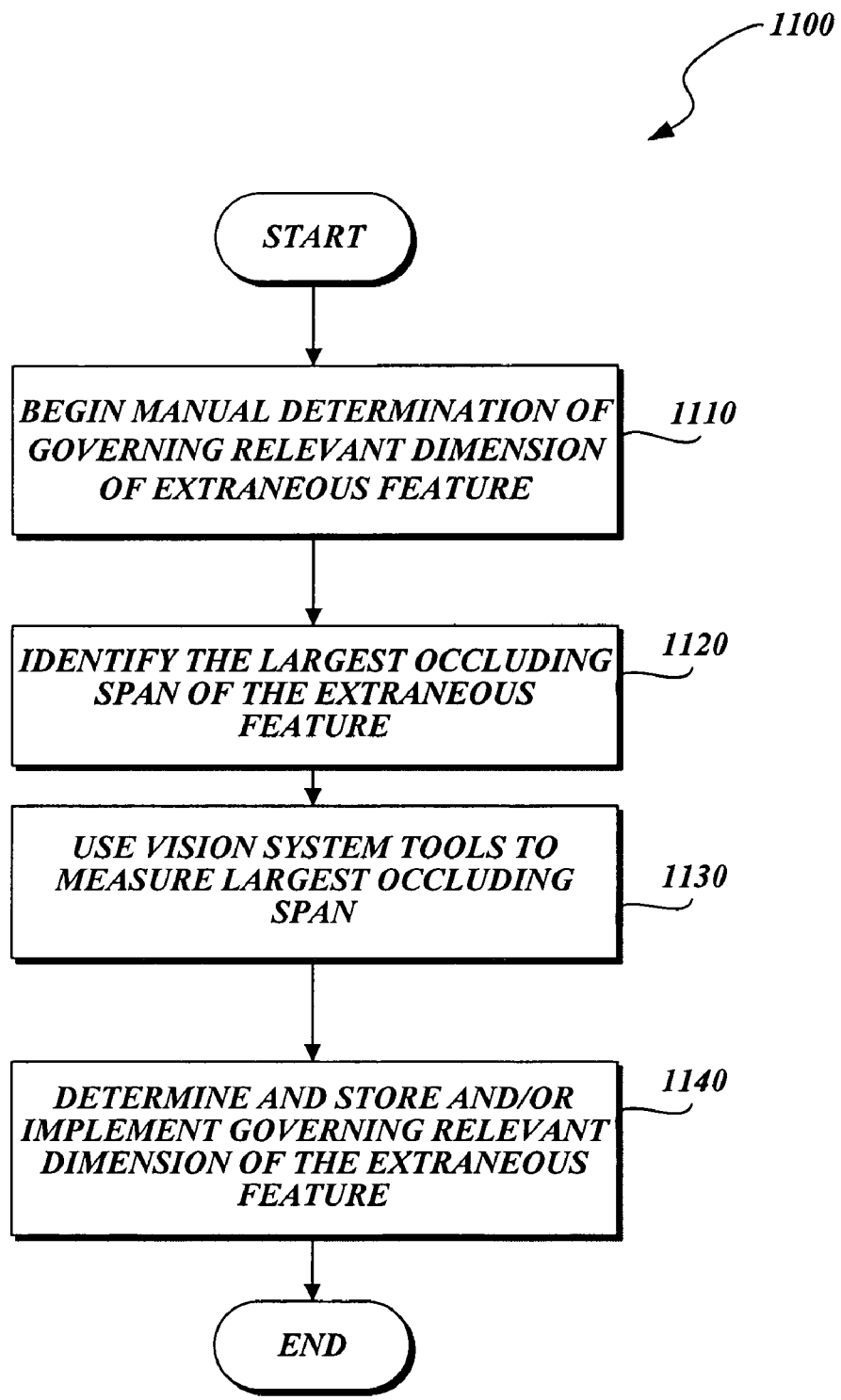
FIG. 11 is a flow diagram illustrative of one exemplary embodiment of a routine for manually determining a governing relevant dimension of an extraneous feature.

FIG. 11 is a flow diagram illustrative of one exemplary embodiment of a routine 1100 for performing a manual determination of a governing relevant dimension of an extraneous feature in an image. In various embodiments, the routine 1100 may be performed at block 1030 of FIG. 10 or at block 1370 of the routine 1300 shown in FIG. 13. As shown in FIG. 11, at a block 1110, the manual determination of the governing relevant dimension of the extraneous feature begins for a current image, ROI, or feature to be inspected. The operations of the routine 1100 may be performed in a manual mode in order to perform manual workpiece inspection operations. In other instances, they may be performed in a learn mode/training mode manually, semi-automatically, or automatically in order to define an inspection procedure including morphological filtering operations to be recorded in a part program. At a block 1120, the location of the largest occluding span of the extraneous feature that is relevant to the current image, ROI, or feature to be inspected is identified visually, or with the aid of any now known or later developed video tool, or the like. At a block 1130, the vision system video tools or the like are used to measure the largest occluding span. In some implementations, if the occluding span is part of a repetitive feature or pattern, an appropriate representative span included anywhere in the pattern may be measured. At a block 1140, the governing relevant dimension of the extraneous feature is determined and stored and/or implemented. In some cases, the largest occluding span may be determined to be the governing relevant dimension. In various embodiments, the determination of the governing relevant dimension at the block 1140 may also take into account any operational default limits that are applicable to the governing relevant dimension, and a default limit may be determined as the governing relevant dimension based on a comparison to the largest occluding span. Various examples of such default limits have been previously described.

The governing relevant dimension may be implemented to determine the characteristics of a structuring element to be used for a manual inspection operation. Alternatively, the governing relevant dimension may be stored or implemented in a part program, to determine the characteristics of a structuring element to be used for automatic inspection of a workpiece at a later time.

Figure 12:
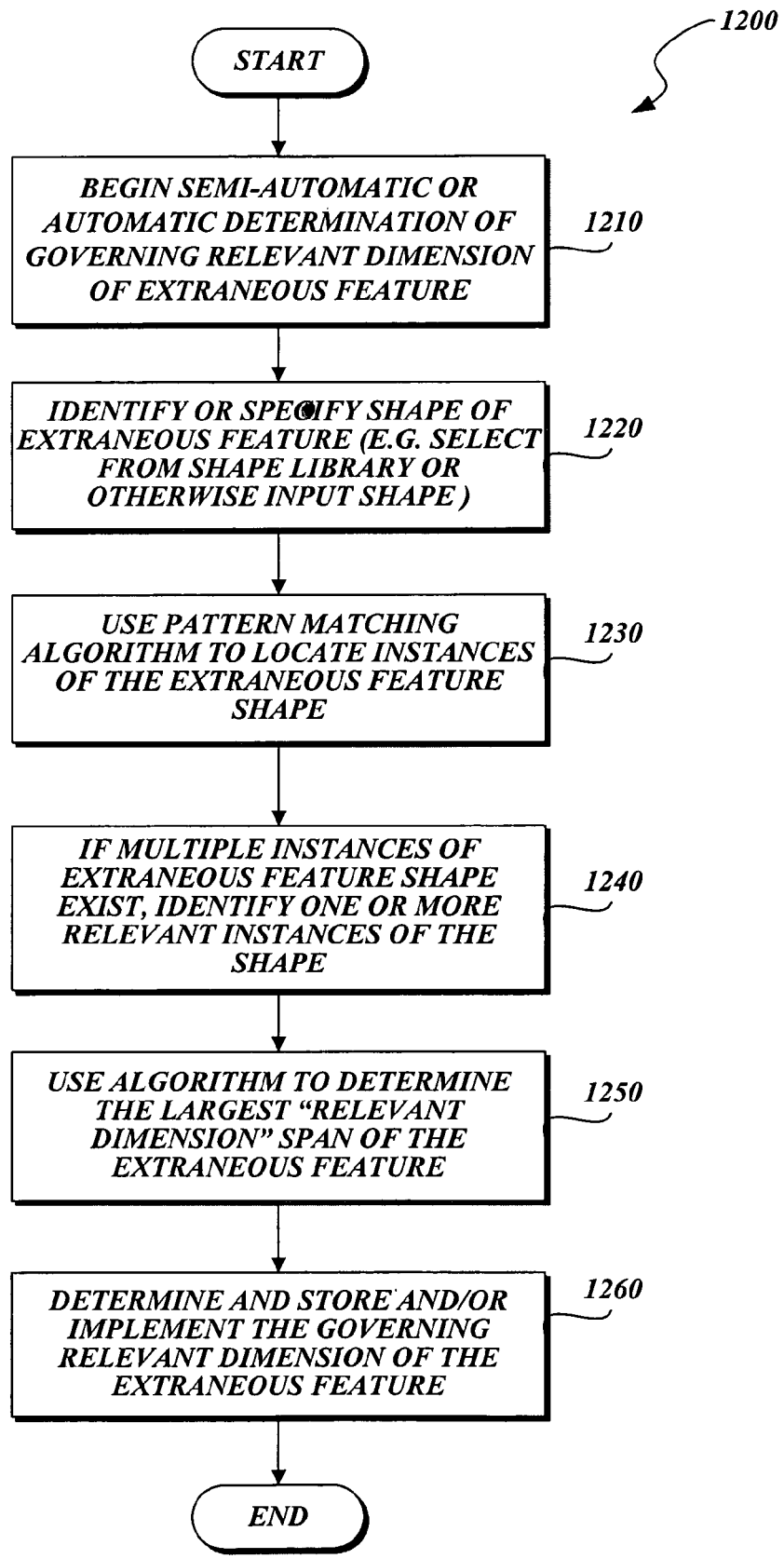
FIG. 12 is a flow diagram illustrative of one exemplary embodiment of a routine for semi-automatically or automatically determining a governing relevant dimension of an extraneous feature.

FIG. 12 is a flow diagram illustrative of one exemplary embodiment of a routine 1200 for semi-automatically or automatically determining a governing relevant dimension of an extraneous feature proximate to a feature to be inspected. In various embodiments, the routine 1200 may be performed at block 1030 of FIG. 10 or at block 1370 of the routine 1300 shown in FIG. 13. As shown in FIG. 12, at a block 1210, the semi-automatic or automatic determination of the governing relevant dimension of the extraneous feature begins for a current image, ROI, or feature to be inspected. The operations of the routine 1200 may be performed as semi-automatic or automatic operations, for example as operations underlying a video tool used during a manual mode of operation in order to perform manual workpiece inspection operations. In other instances, they may be semi-automatic or automatic operations performed in a learn mode/training mode in order to define an inspection procedure including morphological filtering operations to be recorded in a part program. In yet other instances, they may be performed automatically during a run mode of operation to determine or refine a filtering characteristic or parameter during the execution of a part program that includes a set of workpiece inspection instructions that include morphological filtering operations.

At a block 1220, the shape of the extraneous feature is identified, input, or specified, by any now-known or later-developed means. For example, during a training mode of operation the user may select or input the type of shape from a shape menu, or library, or by text or drawing input, or by identifying a shape to be used as a template, or the shape may be identified by geometric pattern recognition, or the like. During an automatic run mode of operation, the shape type or a template of the extraneous feature shape or the like may be recalled from memory or specified by the part program instructions. As one example, when the extraneous feature is a portion of a grid, depending on the size of the region of interest relative to the grid, the shape may be a rectangle corresponding to one or more bars of the grid, an x-shape corresponding to one or more intersections of the grid, or a shape or pattern corresponding to one or more box-shaped cells of the grid, or the like.

At a block 1230, a pattern matching algorithm is utilized to locate instances of the specified extraneous feature shape in the ROI (or in other embodiments, in a larger region of the current image). At a block 1240, if multiple instances of the specified extraneous feature shape exist in the ROI (or in other embodiments, in a larger region of the image), one or more relevant instance(s) of the shape are identified and/or selected. As one example, during automatic operation a relevant instance may be chosen as an instance included in the current ROI, or having a centroid closest to, or sufficiently close to an edge selector location, or a point tool location, etc., that is used to define an inspection operation on a current feature to be inspected in a region of interest. As another example, during learn mode of operation, multiple instances may be indicated in the workpiece image on a display screen (for example, by colored shape outlines or fills, or the like), and the user may identify or select the preferred instance manually, through a user interface.

At a block 1250, an algorithm is utilized to measure the largest occluding span and determine the governing relevant dimension of the extraneous feature. For example, when a current feature to be inspected is a linear edge, the algorithm may include inputting, recalling, or otherwise determining the orientation of the edge, and evaluating the number of contiguous pixels included in the relevant instance(s) of the extraneous feature shape along a number of scan lines parallel to the orientation of the edge. The largest number of contiguous pixels determined corresponds to the largest relevant dimension. Then, at a block 1260, the governing relevant dimension is determined and stored and/or implemented. In some cases, the largest occluding span may be determined to be the governing relevant dimension. In various embodiments, the determination of the governing relevant dimension at the block 1140 may also take into account any operational default limits that are applicable to the governing relevant dimension, and a default limit may be determined as the governing relevant dimension based on a comparison to the largest occluding span. Various examples of such default limits have been previously described.

The governing relevant dimension may be implemented to determine the characteristics of a structuring element to be used for a manual inspection operation. Alternatively, during a learn mode of operation the governing relevant dimension may be stored or implemented in a part program, to determine the characteristics of a structuring element to be used for automatic inspection of a workpiece at a later time. Furthermore, during a run mode of operation the governing relevant dimension may be implemented to determine or refine a filtering characteristic or parameter used during the execution of a part program.

Figure 13:
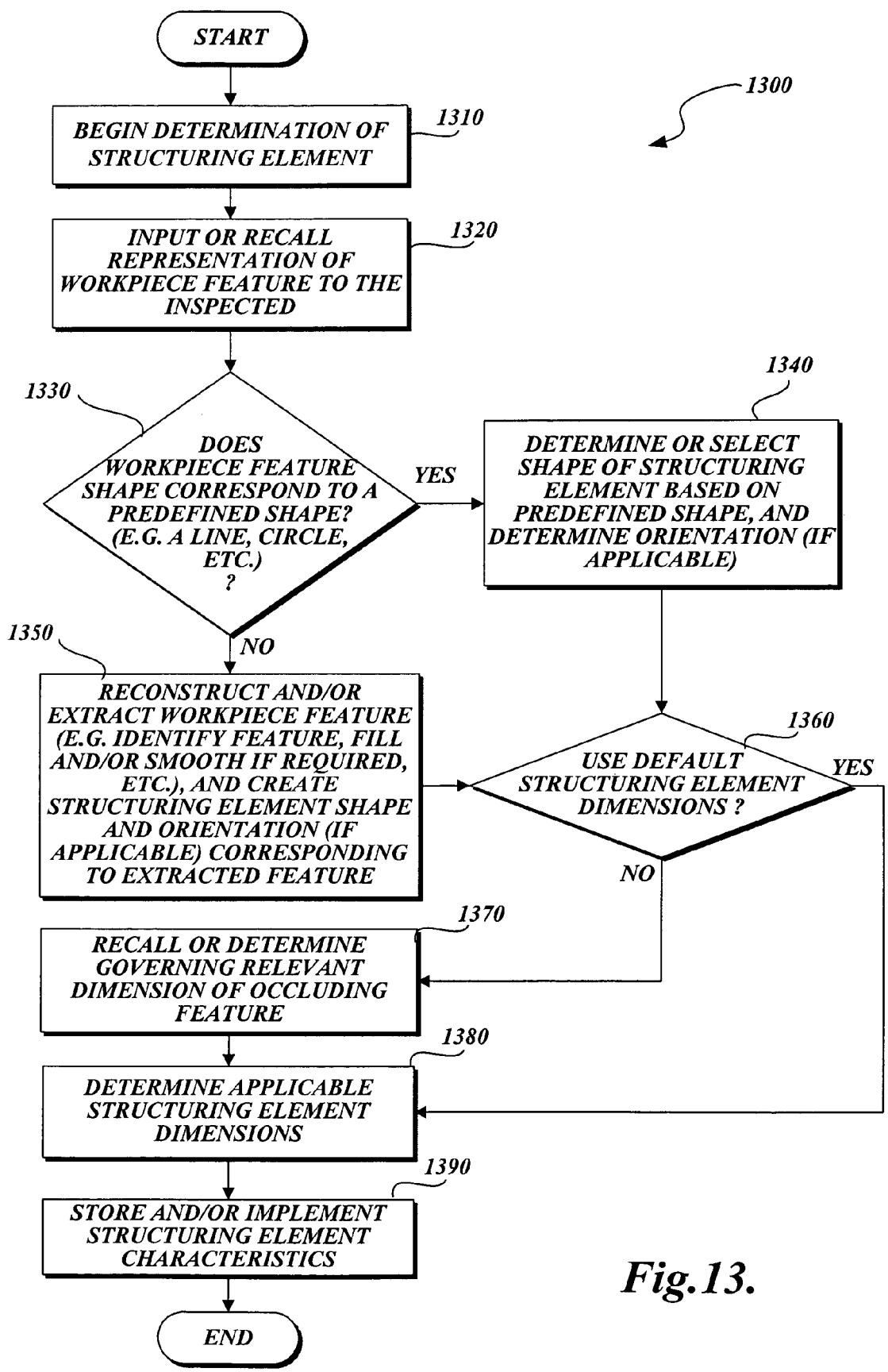
FIG. 13 is a flow diagram illustrative of one exemplary embodiment of a routine for determining the characteristics of a structuring element.

FIG. 13 is a flow diagram illustrative of one exemplary embodiment of a routine 1300 for determining the characteristics of a structuring element. The operations of the routine 1300 will typically be performed during a manual inspection or learn mode of operation of a machine vision inspection system. However, the operations of the routine may in some cases be adapted to automatically refine the characteristics of a structuring element to adjust to minor variations between parts that can be inspected by the same part program, during a run mode of operation. In one embodiment, the routine 1300 may be utilized at blocks 1020-1040 of FIG. 10 and/or in the operations of block 940 of FIG. 9. As shown in FIG. 13, at a block 1310, the determination of the characteristics of the structuring element begins. At a block 1320, a representation of the workpiece feature to be inspected is recalled and/or input for subsequent operations of the routine 1300. In various embodiments or applications, the representation of the workpiece feature may comprise CAD data, a simulated image based on CAD data, or an actual image including the workpiece feature, or the like.

At a decision block 1330, the workpiece feature representation is analyzed to determine whether the workpiece feature to be inspected has a shape that corresponds to (that is, can be accurately filtered by) any shape included in a set of predefined structuring element candidate shapes. As previously described herein, in general, the shape of a structuring element is chosen to match the feature or portion of a feature that is to be inspected. Thus, for convenience, a machine vision inspection system according to this invention may include a library, menu, or list, or the like, defining a set of predefined types of structuring element candidate shapes, which may include, for example, a straight line and/or one or more generic rectangular shape(s) (which are usable to filter linear features and edges as previously described), a right-angle "L-shaped" pattern (usable to filter corners), a circle (usable to filter circles or circle segments), a constant-curvature arc (usable to filter segments of annular shapes), one or more generic triangular shape(s) (usable to filter triangular shapes), or any other shape that is expected to commonly occur as the shape of a feature to be inspected. The determination whether the workpiece feature corresponds to one of the predefined shapes may be performed manually, semi-automatically or automatically during a manual or learn mode of operations, for example by visual recognition or comparison, geometric analysis and categorization, geometric pattern matching (which may also include morphological shape variations), or template matching, or the like.

If the workpiece feature to be inspected corresponds to any shape included in the set of predefined structuring element candidate shapes, then operation continues at block 1340, where the structuring element shape is set accordingly. In various embodiments, if it is required for accurate filtering, various angles and/or aspect ratios, etc., of a generic shape may be modified or adapted in the operations of block 1340, to better match the feature to be inspected. Also at the block 1340, if the structuring element shape allows its orientation to be recognized, then the orientation of the feature to be inspected is determined manually (generally with the aid of one or more video tools of the machine vision inspection system), semi-automatically, or automatically. Then the orientation of the structuring element is defined to be parallel to the orientation of the feature to be inspected, and the related orientation parameter(s) or characteristic(s) may be stored for later use in a part program and/or implemented in a structuring element used for filtering. Various aspects of automatically determining the orientation of linear features are discussed further below.

If it is determined at block 1330 that the workpiece feature does not correspond to any of the predefined shapes (for example, when it is an irregular shape or a combination of shapes), then operation continues to block 1350, where the workpiece feature shape is extracted or determined from the workpiece feature representation, by any now-known or later-developed method. For example, the feature edges or boundaries may be identified and/or completed and smoothed by various known image processing techniques, or the feature to be inspected may be filled by region growing techniques or other known image processing techniques to reveal the edges or boundaries. The resulting revealed feature shape may then be "extracted" by known image processing techniques and used as the structuring element shape. In such cases, the structuring element will be geometrically similar to the feature to be inspected. Also at block 1350, if the structuring element shape allows its orientation to be recognized (which will generally be the case), then the orientation of the feature to be inspected is determined, stored and/or implemented as previously described for similar operations at block 1340.

From either of the blocks 1330 or 1350, operation continues at a decision block 1360, where it is decided whether some type of default dimension(s) will be used for the structuring element dimension(s). This decision may be semi-automatically or automatically determined based on a default setting for morphological filtering operations, based on the type of shape used for the structuring element, or it may be determined by user input. In various embodiments or applications, particularly when the characteristics of a feature to be inspected are consistent and predictable, it is convenient to establish default dimension(s) for various structuring elements shapes. Generally, the use of default dimensions allows inexperienced users to obtain inspection results and/or create part programs more quickly. This decision may be semi-automatically or automatically determined based on a default setting for morphological filtering operations, based on the type of shape used for the structuring element, or it may be determined by user input. Typically, when default dimensions are used, the resulting structuring element will be reduced in size relative to the feature to be inspected, to a level determined by the default dimensions. Functional and/or desirable levels of size reduction, and/or minimum sizes usable for default dimensions (for example, in relation to the filtering speed, the number of iterations required for effective filtering, and/or providing sufficient shape or orientation resolution for a various shapes, etc.) may be understood and implemented by analogy with the previous teachings and examples related to circular and linear features and their corresponding structuring elements.

If it is decided to use default dimensions at the decision block 1360, then operation continues to block 1380, where the default dimensions are applied to determine the structuring element dimensions. If it is decided not to use default dimensions at the decision block 1360, then operation continues to block 1370, where the governing relevant dimension is determined for the occluding feature proximate to the feature to be inspected. For example, the governing relevant dimension may be determined according to the operations described with reference to FIG. 11 or FIG. 12, or as otherwise taught herein. If such operations are performed prior to the operations of the block 1370, then the stored value of the governing relevant dimension may simply be recalled at block 1370 for use in subsequent operations, otherwise such operations are include at block 1370. In either case, at block 1380 the governing relevant dimension is applied to determine the structuring element dimensions.

At block 1390, parameters or data defining the structuring element's characteristics, such as its shape, dimensions, and orientation if applicable, are stored for later use in a part program and/or implemented in a structuring element used for filtering, and the routine ends.

FIGS. 14-20 are diagrams of screen displays illustrating various graphical user interface and control features usable in conjunction with systems and methods according to this invention. As will be described in more detail below, to define and/or use various morphology filter operations according to this invention, a user first defines a region of interest with a video tool (e.g., a box tool, etc.). In one embodiment, the user may then operate the tool, for instance by double clicking on a portion or feature of the tool, to bring up a dialog box for that specific tool. On an "advanced" tab, and in a "filter type" list, the user chooses "morphology" in order to enable or activate the use of various morphological filtering operations according to this invention, and then clicks on "parameters." This brings up a "morphology filter settings" dialog box from which the user can preview and/or select various filter settings.

Figure 14:
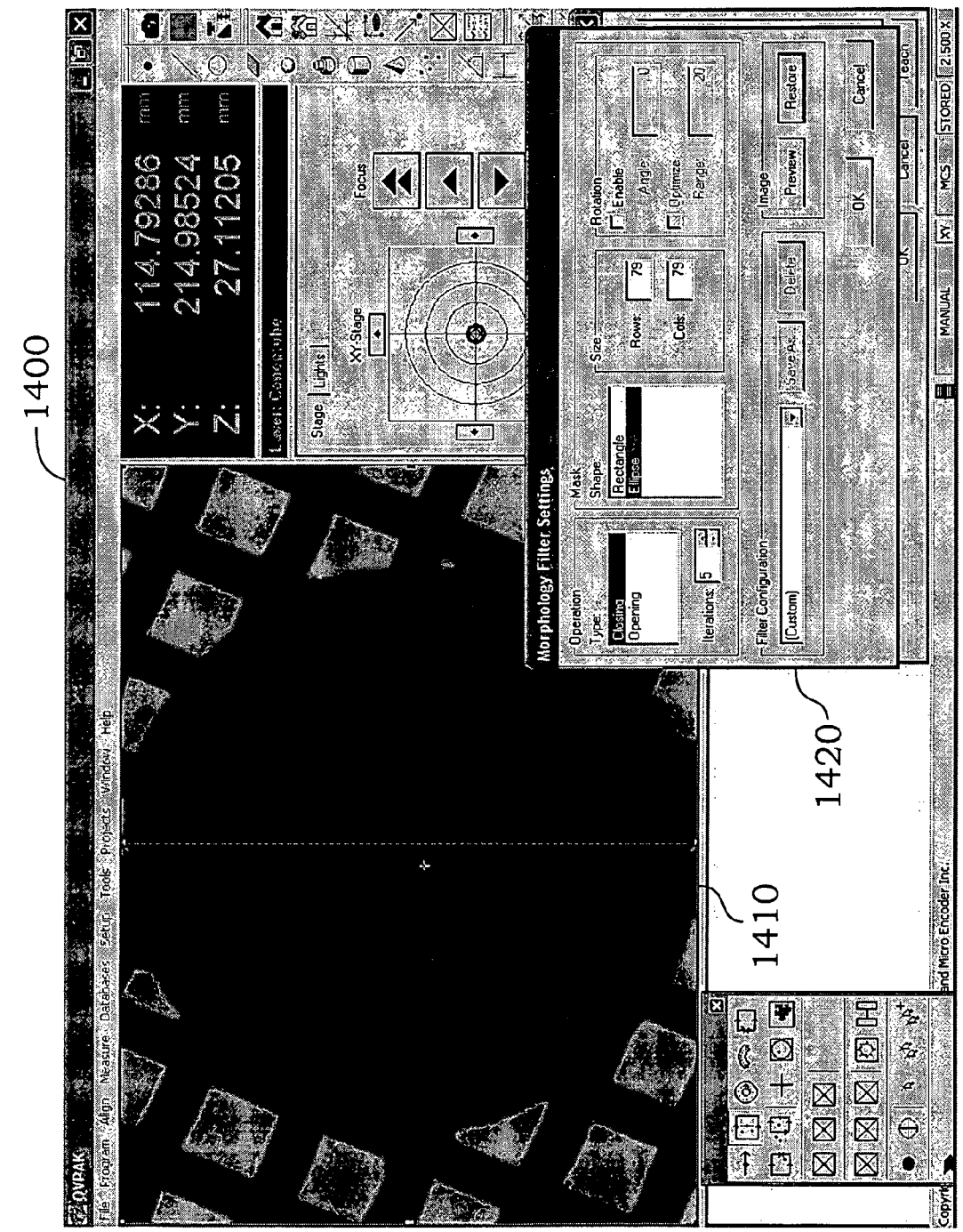
FIG. 14 is a diagram of a screen display illustrating a box tool used to define a large region of interest containing a circular workpiece feature.

FIG. 14 is a diagram of a screen display 1400 illustrating a box tool used to define a region of interest (having borders that approximately coincide with the borders of the image window display area 1410 in FIG. 14) containing a circular workpiece feature. As shown in FIG. 14, the circular workpiece feature which has been selected by the box tool is displayed in a display area 1410. A dialog box 1420 indicates that the mask shape, otherwise referred to as the structuring element shape herein, is selected from a predefined list of candidate as an ellipse, and has equal row and column dimensions of 79 pixels, making it a circle. In various embodiments, the dimensions may initially be set to default values, and/or the dimensions may be determined for the current image according to previously described principles and entered by the user. A highlighted "Restore" button at the bottom right corner of the dialog box 1420 indicates that the display image is an image as seen by the camera of the machine vision inspection system.

Figure 15:
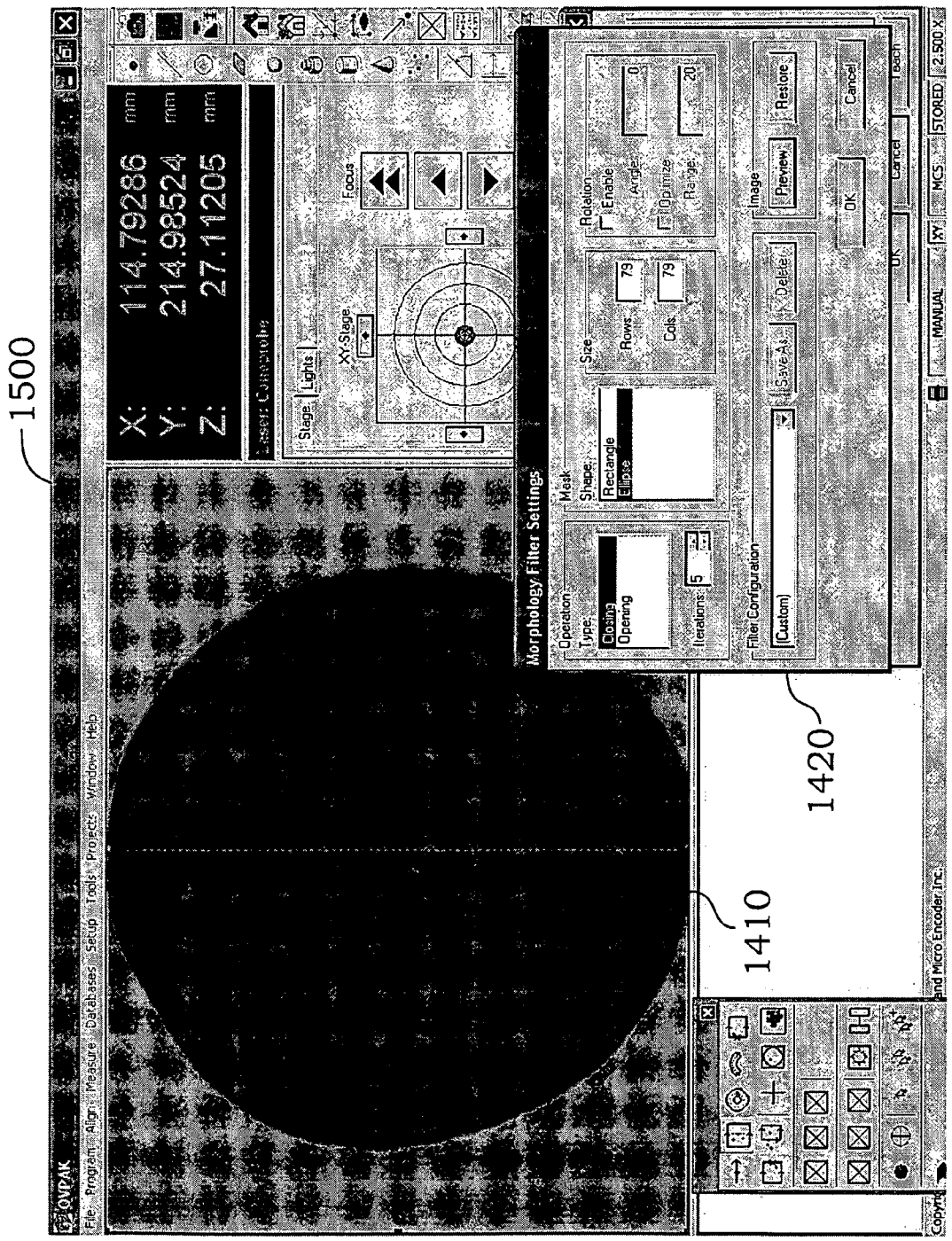
FIG. 15 is a diagram of a screen display illustrating a filtered image provided by the selection of a preview function in a morphology filter settings dialog box, which allows a user to preview the results of filter settings before the filter settings are accepted for inspection operations.

FIG. 15 is a diagram of a screen display 1500, wherein the display area 1410 includes the filtered image resulting from applying morphological filtering operations defined according to the parameters in the dialog box 1420, to the image shown in FIG. 14. In one embodiment, the filtered image is created and displayed based on activation of the "Preview" button at the bottom right corner of the dialog box 1420. The highlighted "Preview" button indicates that the display image is an image filtered according to the settings in the dialog box 1420. Through this feature, the user is able to preview the results of filter settings before applying them or incorporating them in a part program. The user may toggle between the "Restored" and "Preview" images using the buttons, take comparative measurements using video tools on the two images, etc.

Figure 16:
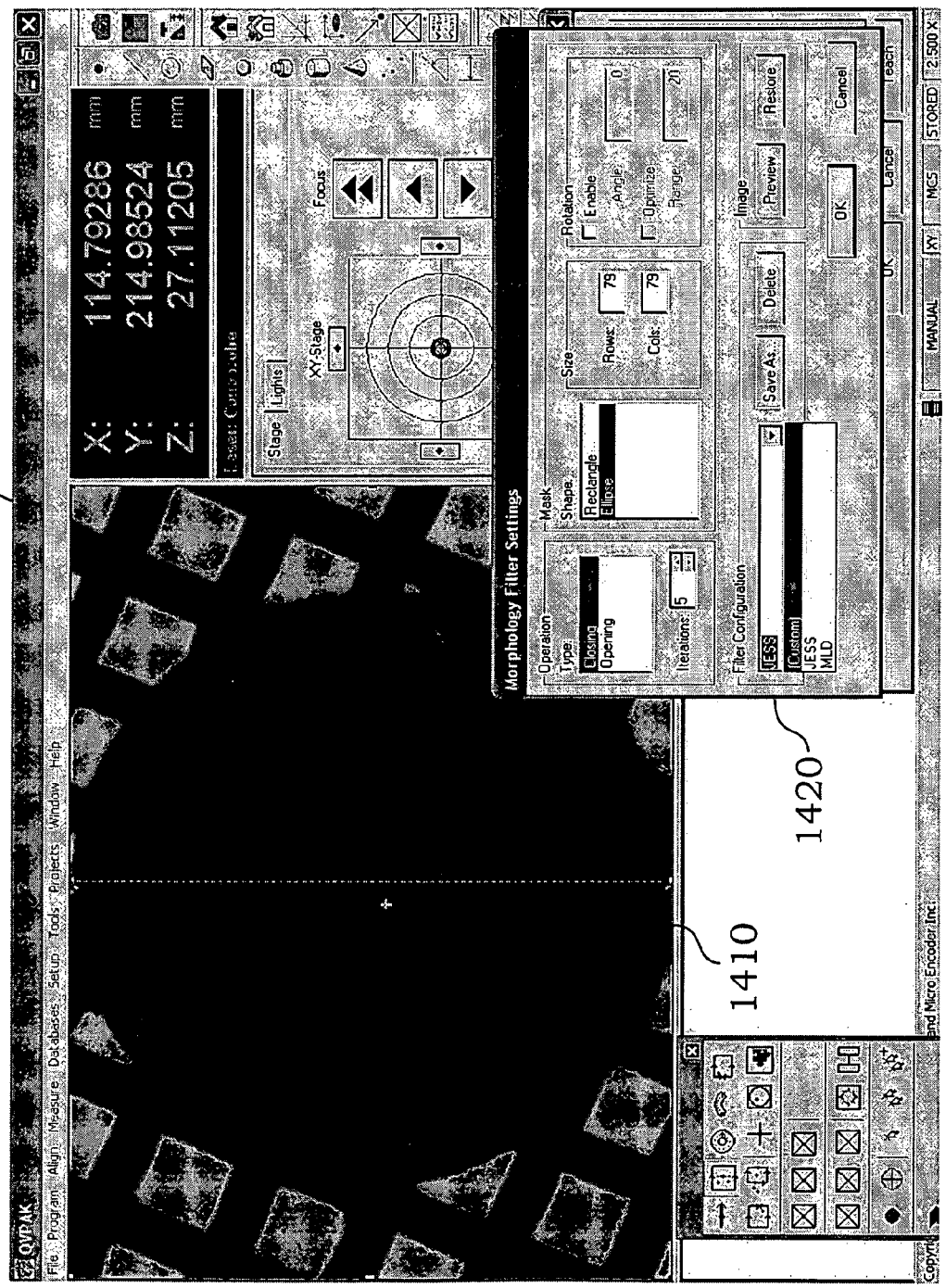
FIG. 16 is a diagram of a screen display illustrating an expanded filter configuration list which allows a user to name and save current filter settings.

FIG. 16 is a diagram of a screen display 1600 showing an expanded filter configuration list. As shown in FIG. 16, the dialog box 1420 contains various filter configuration settings, including "JESS" and "MLD." This feature allows users to name and save current filter settings. For example, one might inspect various aspects of a particular workpiece or feature under different lighting conditions such as coaxial lighting and stage lighting. Then the some aspects of the applied morphological filtering operations might differ even though the structuring element size and shape remain the same. For example, if the extraneous feature (grid) appears brighter than the circular feature, then the operation should be set to "Opening", while all other filter parameters remain the same. This could then be stored as a separate filter configuration, called up whenever the associated lighting conditions prevail. As another example, if workpiece features that are to be inspected have different shapes, a structuring element corresponding to each shape could be determined during learn mode, and the corresponding filter settings saved for easy retrieval using an associated filter configuration name, when later or repeatedly inspecting the relevant portion of a similar workpiece containing the corresponding feature. The main purpose of providing this functionality is for ease of use for an operator.

Figure 17:
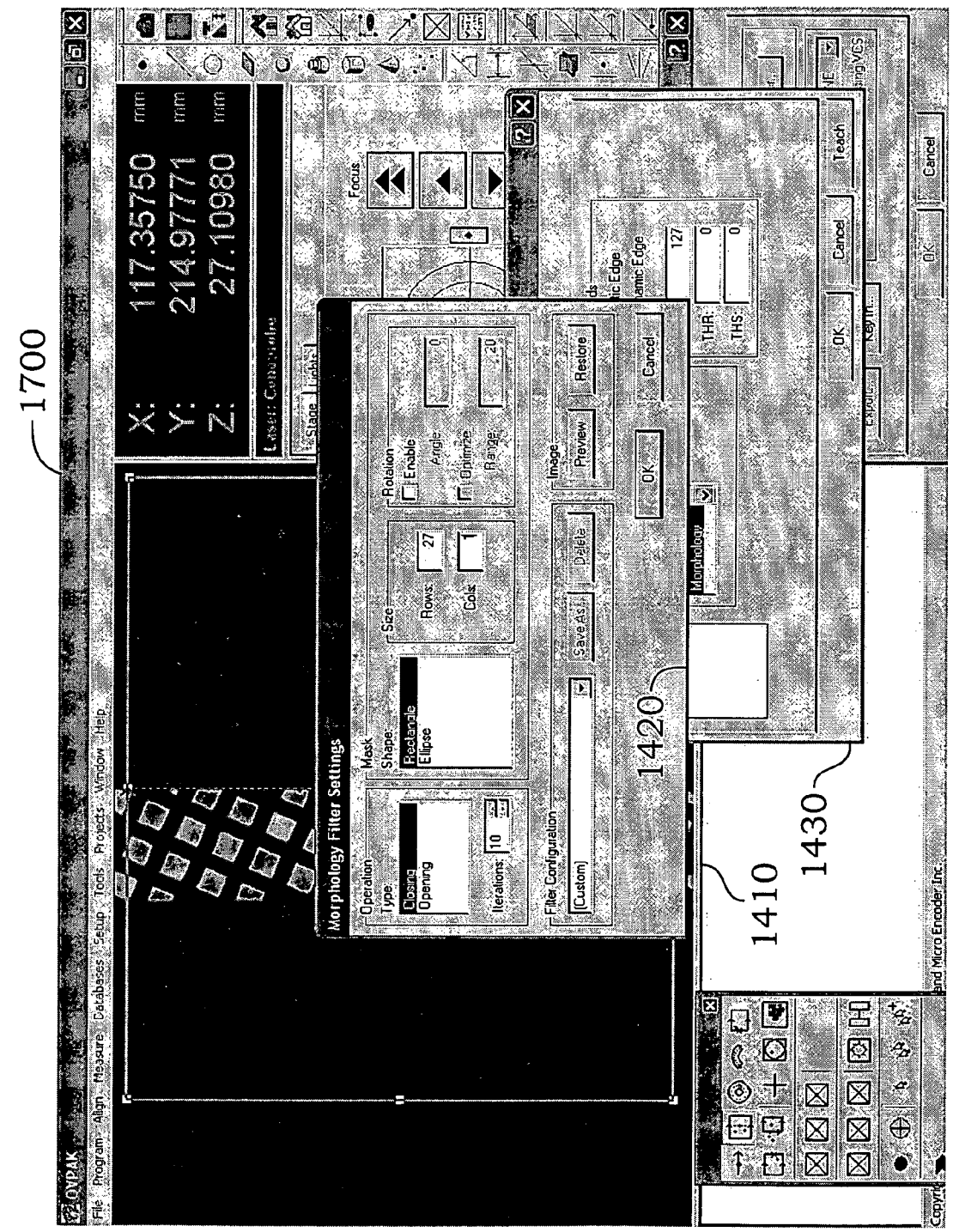
FIG. 17 is a diagram of a screen display illustrating settings in the morphology filter settings dialog box for a linear-type workpiece feature.

FIG. 17 is a diagram of a screen display 1700 which illustrates various morphology filter settings in the dialog box 1420, including a rectangular structuring element shape, otherwise referred to as a linear type structuring element shape herein. As shown in FIG. 17, the display area 1410 shows the region of interest defined by a box tool, including a selected edge of a rectangular workpiece feature. The dialog box 1420 shows that the mask shape has been chosen as a rectangle, and that the dimensions of the structuring element have been defined as 27 rows and 1 column, making the structuring element a line of pixels oriented parallel to the edge selected to be measured. In various embodiments, the dimensions may initially be set to default values, and/or the dimensions may be determined for the current image according to previously described principles and entered by the user. It should be appreciated that a 'Mask', that is, a structuring element, can have a complex and/or compound shape. Structuring elements are not limited to the simple geometric shapes generally used as examples herein, and listed in FIG. 17. More complex structuring element shapes, having nearly any shape that matches the shape of a workpiece feature to be preserved, can be designed (or taken from a template derived from an image of the actual workpiece feature, as previously described) for morphological filtering operations that accurately preserve a similarly-shaped complex workpiece feature. Such complex structuring element shapes can be appropriately named and added to the list shown in FIG. 17, if desired.

Figure 18:
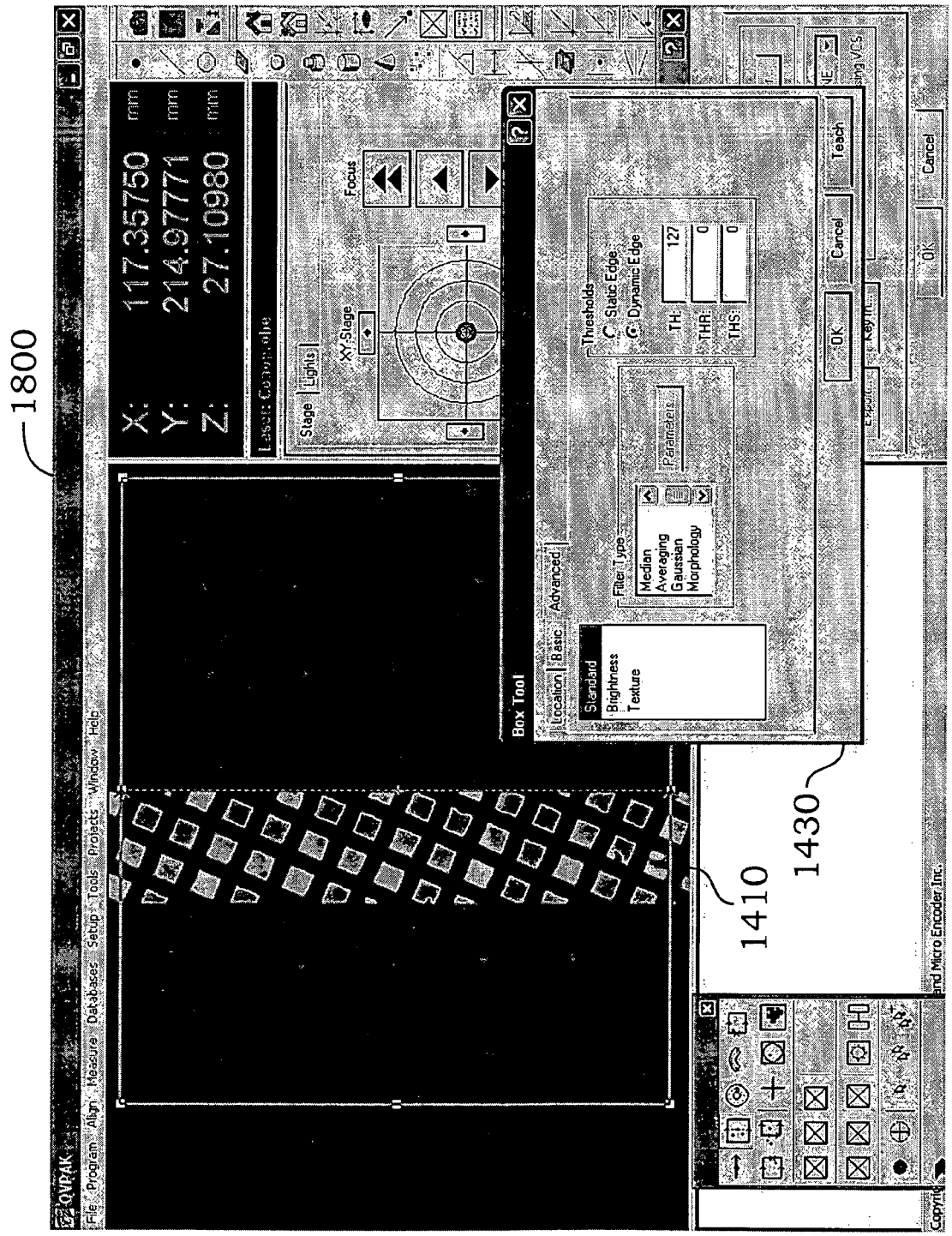
FIG. 18 is a diagram of a screen display illustrating the options in a filter-type list on a box tool dialog box menu.
Figure 19:
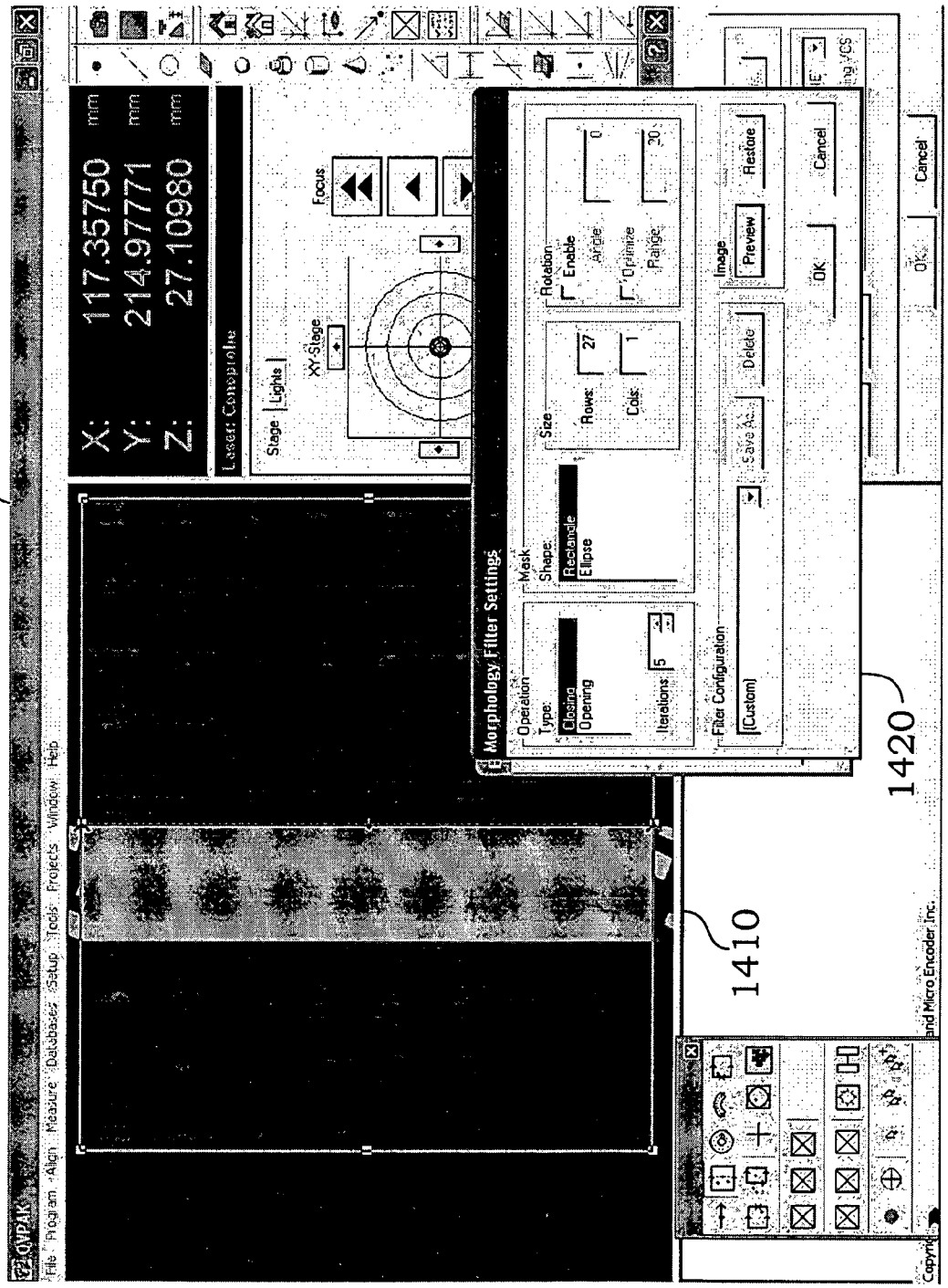
FIG. 19 is a diagram of a screen display illustrating a preview of the filtered image resulting from applying a set of filter settings to linear workpiece features.

FIG. 18 is a diagram of a screen display 1800 which shows the options in a filter-type list on the box tool menu. As shown in FIG. 18, in a box tool dialog box 1430, by clicking on an "Advanced" tab, and in a "Filter Type" list, a user may choose "Morphology" in order to enable and/or activate the use of various morphological filter operations according to this invention. Choosing "Morphology" calls up the previously described "Morphology Filter Settings" dialog box 1420, as shown in FIG. 19. FIG. 19 also shows the filtered image in the display area 1410 that results from the filter settings in the dialog box 1420, as previously describe with reference to FIG. 15. In the embodiment shown in FIG. 18, in the dialog box 1430, options are also provided for selecting "standard," "brightness," and "texture" settings and for setting various threshold values that govern aspects of the box tool operation unrelated to defining morphological filter operations. The filter type options are shown to be "median," "averaging," "gaussian," and "morphology."

FIG. 19 is a diagram of a screen display 1900. As shown in FIG. 19, in the display area 1410, the filter settings in the dialog box 1420 have been applied so as to produce a filtered version of the camera image shown in FIG. 18, in a manner previously described with reference to FIG. 15. The dialog box 1420 indicates that the mask shape is "rectangle." In the dialog box 1420, the "operation type" is selected based on the brightness relationship between the workpiece feature to be inspected and the occluding feature. When the feature to be inspected is light and the occluding feature is dark, a "closing" operation is selected and the feature to be inspected will be preserved. When the feature to be inspected is dark and the occluding feature is light, an "opening" operation is selected and the feature to be inspected will be preserved.

Figure 20:
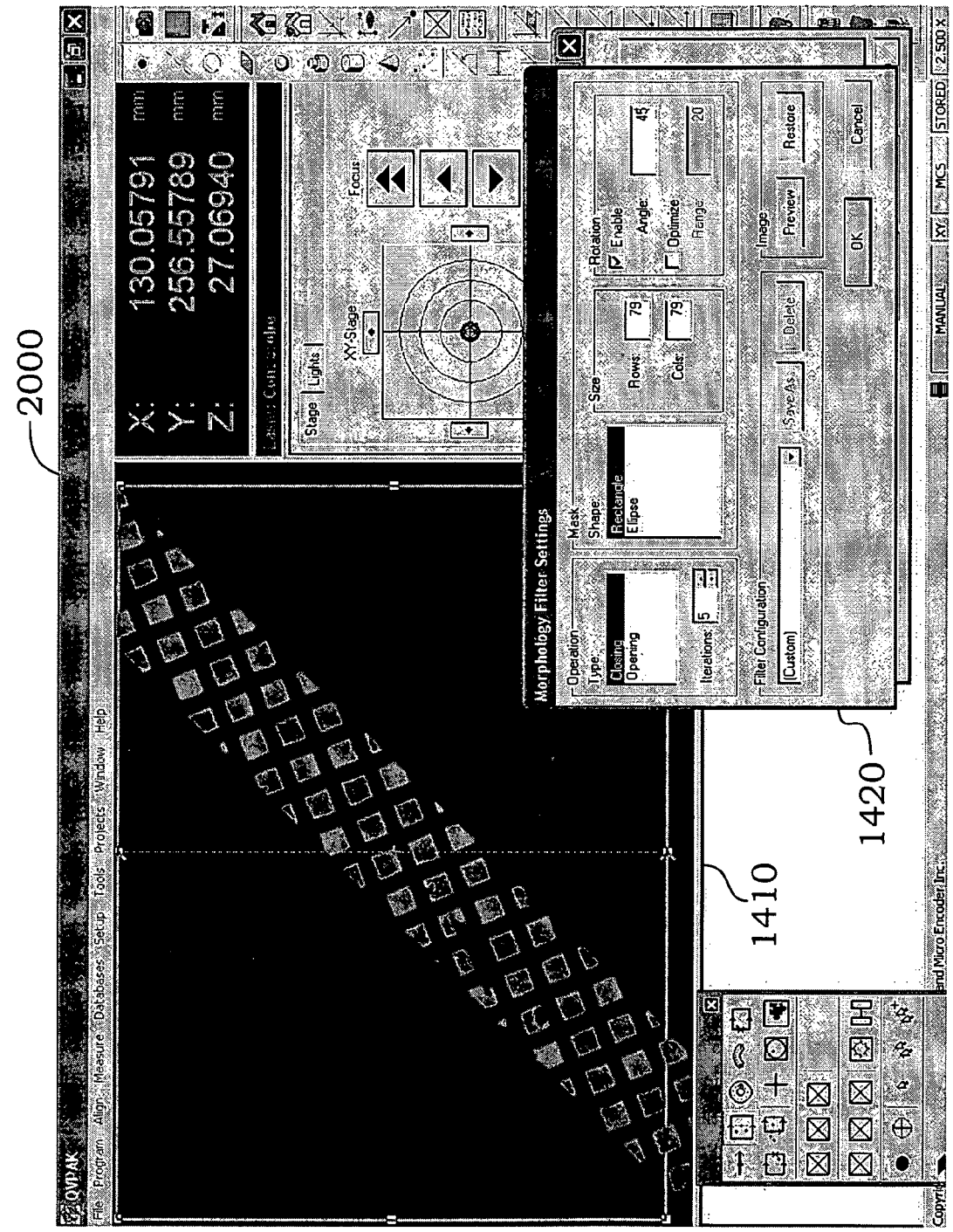
FIG. 20 is a diagram of a screen display illustrating the selection of a rotation filter setting corresponding to a rotated linear workpiece feature to be inspected.

FIG. 20 is a diagram of a screen display 2000 illustrating a rotation operation that orients a rectangular structuring element and the feature to be inspected parallel to one another. (The orientation of the box tool in the image display area 1410, and the "Size" values for the rectangular structuring element are artifacts of the method of creating the diagram for FIG. 20. Their state is generally not desirable or useful for inspecting the image shown in FIG. 20. They should not be considered meaningful.) As shown in FIG. 20, in the display area 1410, a rectangular workpiece feature is "rotated" or oriented at a 45° angle. In order to orient the selected rectangular structuring element parallel to the feature to be inspected in the dialog box 1420 the user clicks in the "Rotation" dialog area to "Enable" the rotation (or orientation) function, and then enters the desired rotation angle in the "Angle" value box. This value is typically predetermined by the user, though it can be determined automatically from the image by image processing techniques. If the rotation option is not enabled by the user, the axes of the structuring element cannot be rotated from their default orientation. The 'Optimize' function is included to allow for automatic alignment of the structuring element with the workpiece feature. This is useful for the following reasons: First, it allows the user to enter a rough angle estimate of the workpiece feature orientation at 'learn' time, and then enable the 'Optimize' feature with a desired search range about the rough angle estimate (over a default search range of +/−10 or 20 degrees, for example) that calls upon some image processing algorithms to accurately determine the workpiece feature orientation within the search range around the entered rough angle estimate. This generally provides a more repeatable and accurate determination of an orientation angle than can be estimated by a user, and also removes the burden of making precise orientation measurements from the user. Secondly, it provides the option of always maintaining the best possible structuring element alignment at run time by automatically re-determining the workpiece feature orientation (which may have changed marginally due to fixturing variations or movement of the workpiece, and/or variability in manufacturing dimension, etc.), generally by searching for the best orientation around the nominal value determined at 'learn' time, and adjusting any related parameter(s) for the orientation of the structuring element. If the workpiece is accurately fixtured during measurement, and no significant variation exists from workpiece to workpiece, the automatic determination and adjustment of the orientation at run time are not necessary. However, in order to provide the most accurate morphological filter of a workpiece feature image, it is often desirable. Once the orientation is determined, the structuring element is formed and the morphology operations are performed as previously described.

Figure 21:
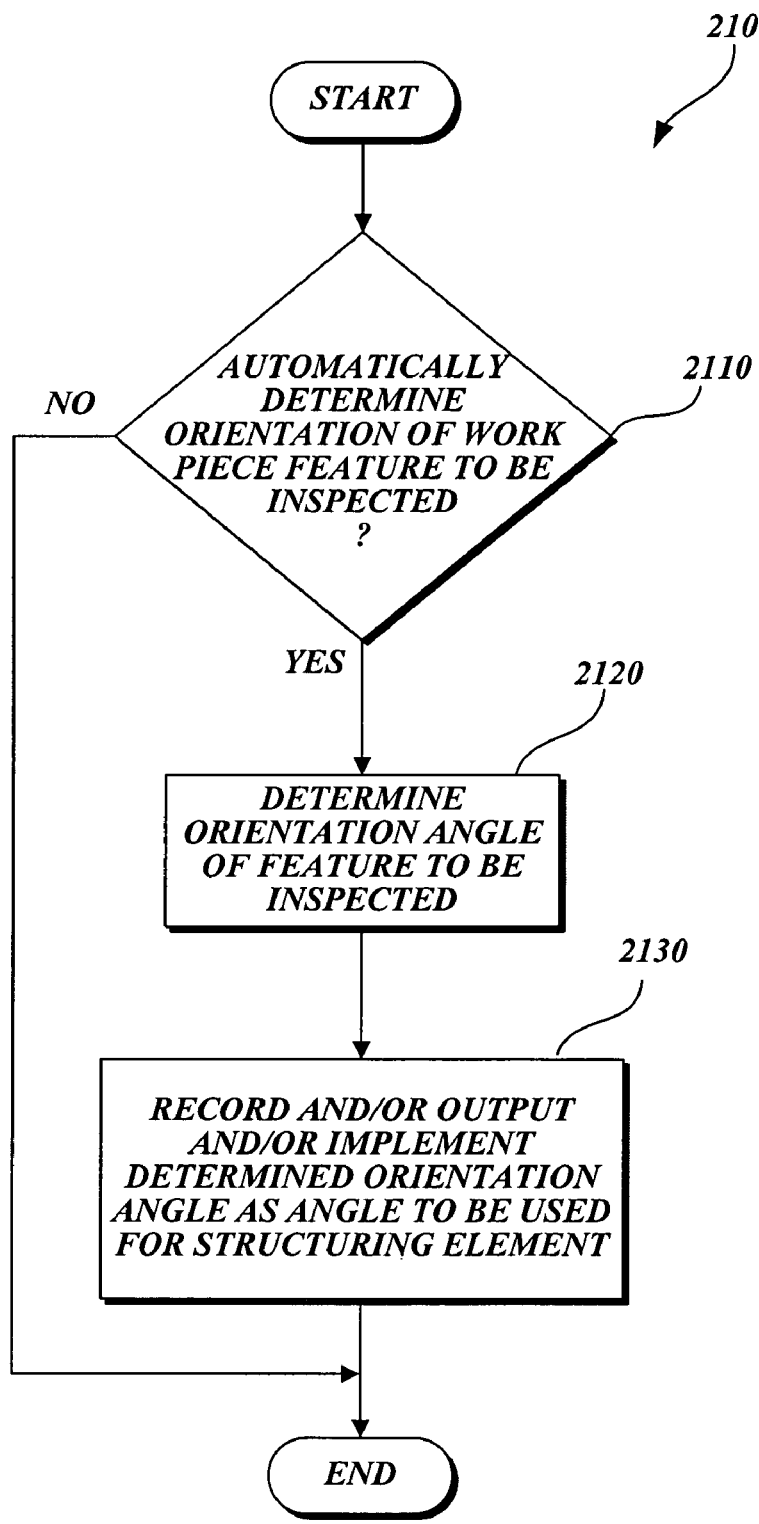
FIG. 21 is a flow diagram illustrative of one exemplary embodiment of a routine that automatically determines the orientation angle of a linear feature to be inspected.

FIG. 21 is a flow diagram illustrative of one exemplary embodiment of a general routine 2100 for performing automatic orientation detection, if required. In one embodiment, the routine 2100 may be utilized in the operations at block 940 of FIG. 9, and/or at block 1020 of FIG. 10, and/or at blocks 1340 and 1350 of FIG. 13. More generally, the operations of the routine 2100 may typically be performed according to part program instructions during a run mode of operation to automatically determine the orientation of a feature to be inspected and refine or adjust the orientation of the structuring element relative to the feature to be inspected, in order to provide accurate filtering results despite minor variations in the workpiece configuration or fixturing, or the like. For example, to illustrate one possible implementation, when a user interface such as that described for FIGS. 14-20 is used, and the "Enable" box is checked in the Rotation dialog box shown in FIG. 20 during the creation of a part program in a learn mode of operation, then the operations of the routine 2100 may be implemented as corresponding instructions included in the part program for filtering operations related to the current workpiece feature to be inspected. However, the operations of the routine may in some cases be used to determine the orientation of a structuring element to be used for filtering during manual inspection operations, or for semi-automatic or automatic determination of a workpiece feature orientation during a learn mode of operation, such that it can be recorded in a part program as a nominal orientation parameter for structuring element. In various part programs, the nominal orientation for a structuring element may either to be used without modification at run time, or it may be used as a parameter that guides similar automatic orientation determining operations performed during the run mode of operation, to refine or adjust a structuring element orientation as described above, to provide more robust operation or the best possible filtering accuracy.

The operations of the routine 2100 begin at a decision block 2110, where a decision is made whether to automatically determine the orientation of a workpiece feature to be inspected. For example, when both the "Enable" box and the "Optimize" box are checked in the Rotation dialog box shown in FIG. 20 during the creation of a part program in a learn mode of operation, then an associated flag or instruction is included in the part program to indicate that the orientation of the workpiece feature to be inspected is to be automatically determined. If the orientation of a workpiece feature is not to be automatically determined, then the routine ends.

If the orientation is to be automatically determined, then the routine continues from block 2110 to a block 2120, where the workpiece feature orientation is determined, for example, by any of the methods outlined below with reference to FIG. 22, or by any other appropriate now-known or later-developed method. The routine then continues at a block 2130, where the orientation angle by the operations of block 2120 is recorded, output, and/or implemented as the orientation angle to be used for the structuring element in filtering operations associated with the workpiece feature to be inspected.

The routine 2100 is particularly useful in situations where it is important to have a structuring element precisely aligned with a linear feature to be inspected. In other words, while the accuracy provided by the structured morphology filtering methods disclosed herein is useful in many situations even if a properly shaped structuring element shape is not well-aligned with a workpiece feature to be inspected, in general the best accuracy is provided when the orientation of the structuring element is aligned as well as possible to the orientation of the workpiece feature. Of course, it is generally desirable to determine the workpiece feature orientation with high resolution and accuracy and, if possible, at high speed. High speed is particularly useful during run mode operations, where the throughput of inspection operations is an important factor.

As disclosed below, a workpiece feature orientation angle may be determined with good accuracy, within a relatively short execution time on a machine vision inspection system, by using a method that uses projection vectors. Briefly, a projection vector, as the term is used here, is a set of values where each respective value corresponds to a net image intensity determined by summing or "projecting" the image intensities for each spatial increment included along a respective projection direction onto a projection line or projection plane. A complete projection vector consists of several such values determined along the same projection direction and located at a known location along the projection line or plane. For example, in one simple case, a horizontal direction across an image may be defined to lie at an orientation angle of 0°. In that case, summing the pixel intensity values along a respective horizontal row of pixels provides one respective value for a projection vector determined along a "0°" projection direction onto a vertical projection line or plane. A complete projection vector along a "0°" projection direction would consists of several such values, taken in succession, for a succession of horizontal rows of pixels. By analogy, a complete projection vector along a "90°" projection direction onto a horizontal projection line or plane would consists of several such values, taken in succession, for a succession of vertical columns of pixels. FIG. 22 further clarifies the concept of a projection vector and describes how it may be used to determine the orientation of a linear feature or a linear edge.

Figure 22:
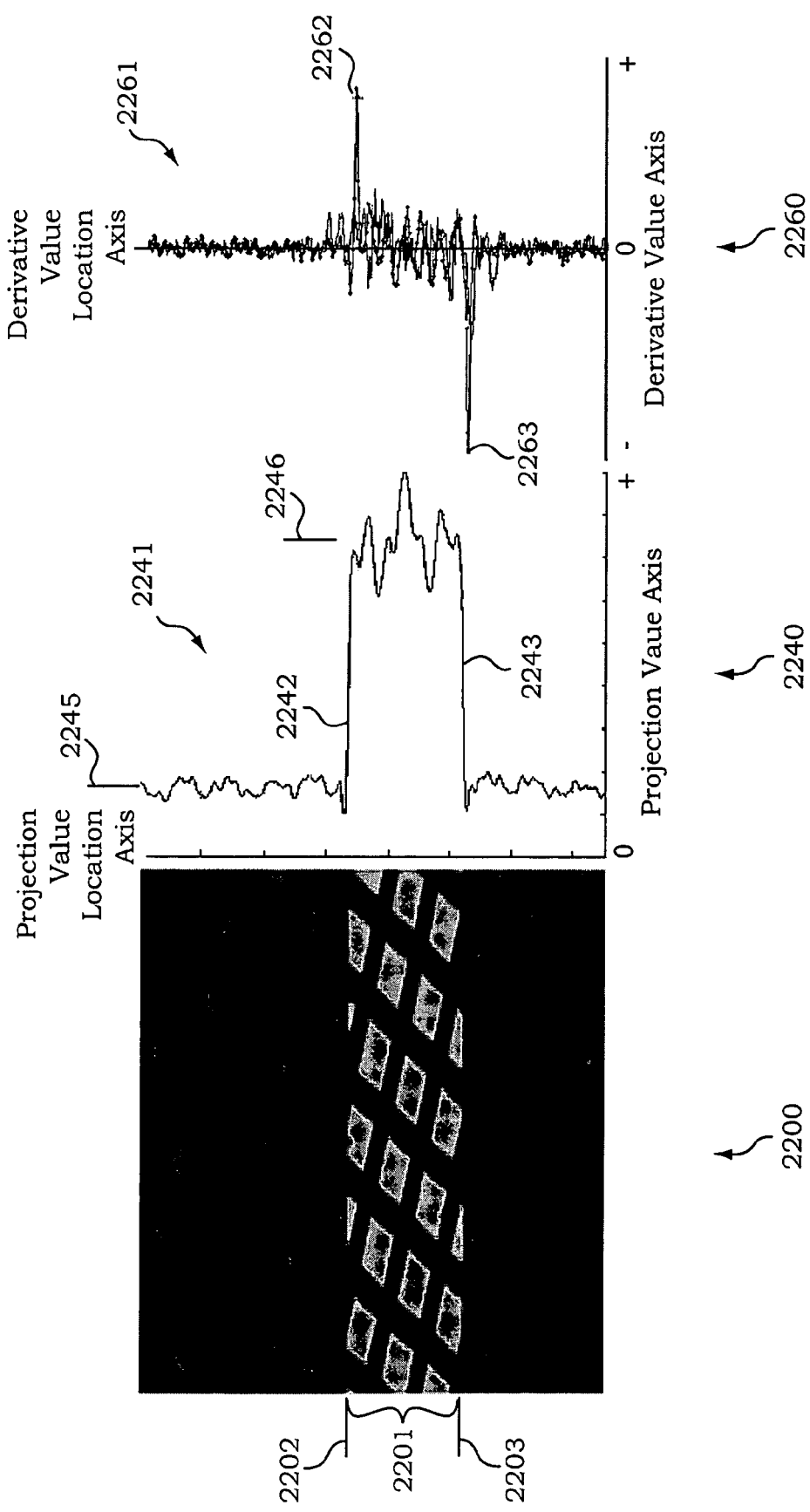
FIG. 22 includes an image and related charts illustrating various aspects of using projection vectors to determine the orientation angle of a linear feature to be inspected.

FIG. 22 shows a workpiece image 2200 that includes a linear feature 2201 having linear edges indicated by the lines 2202 and 2203, covered by an occluding grid. FIG. 22 also shows a projection vector chart 2240 that includes a projection vector 2241 that is derived from the workpiece image 2200. In this example, the projection values of the projection vector 2241 are obtained by summing or projecting pixel values along a horizontal or "0°" projection direction (corresponding to the horizontal rows of pixels of the image 2200) onto a vertical projection line or plane, and each projection value (plotted along the horizontal axis of the chart) corresponding to a intensity parameter value determined by summing the intensity values along each row of pixels of the image 2200. More generally, it is preferred to determine an intensity parameter that is insensitive to the overall image intensity, so that inspection results are not sensitive to variations due to machine-to-machine lighting variations, ambient lighting variations, workpiece reflectivity variations, and the like. For example, the intensity parameter values may be the spatial or "per pixel" average of the intensity values included along the corresponding projection direction, divided or otherwise normalized by the overall average intensity of all intensity values used to determine the projection vector, or the like.

As shown in FIG. 22, the projection vector 2241 clearly shows a characteristic range of intensity parameter values for regions outside of the range of the linear feature 2201, as generally indicated by the line 2245, and a characteristic range of intensity parameter values for regions inside the range of the linear feature 2201, as generally indicated by the line 2246. Furthermore, in particular, two transition regions generally indicated by reference numbers 2242 and 2243, clearly correspond to the linear edges 2202 and 2203 of the linear feature 2201.

FIG. 22 also shows a projection vector derivative value chart 2260 that displays a derivative value plot 2261 of the set of derivative values determined at each projection line location along the projection vector 2241. The derivative value plot 2261 clearly shows a nominal derivative value of approximate zero, except in the region of the positive derivative extremum 2262 and negative derivative extremum 2263. These derivative value extrema clearly correspond to the two transition regions 2242 and 2243, as well as the linear edges 2202 and 2203 of the linear feature 2201. In particular, it should be appreciated that when the linear edge 2202 (or 2203) is perfectly aligned along the projection line, the corresponding transition region 2242 (or 2243) will be at its narrowest (along the projection line indicator axis) and steepest. This will correspond to the derivative value extremum 2262 (or 2263) exhibiting its largest possible magnitude.

Thus, it should be appreciated that by determining a set of projection vectors at various angles for an image including a linear feature or linear edge, the angle corresponding to the projection vector having the largest derivative(s) is a good estimate of orientation angle of the linear feature or linear edge. The corresponding projection vector may be referred to as a "best alignment" projection vector. The estimate can be improved by determining the projection vectors at more closely spaced angles and/or interpolating to find the angle corresponding to the peak of a curve comprising the derivative value extremum for the various projection vector angles. One method for determining a projection vector at a particular angle relative to the workpiece image is to temporarily rotate a sufficient portion (or all) of the image surrounding the workpiece feature or region of interest by the angle, according to known image rotation techniques that preserve the image intensity distribution with pixel-level accuracy. Then a projection vector corresponding to the rotation angle may be determined along a sufficient portion (or all) of the horizontal pixel rows, or, alternatively, along the vertical pixel columns, whichever is appropriate for best revealing the orientation of the workpiece feature to be inspected. An alternative method for determining a projection vector at a particular angle relative to the workpiece image is to compute the projection vector along a projection direction that corresponds to that angle in the unrotated workpiece image, taking care to properly allocate various pixel values to the most appropriate projection value, or, for each projection value, to compute interpolated pixel values for locations that precisely correspond to those that should be allocated to that projection value, in order to determine the projection vector corresponding to that angle with a desired accuracy.

Figure 23:
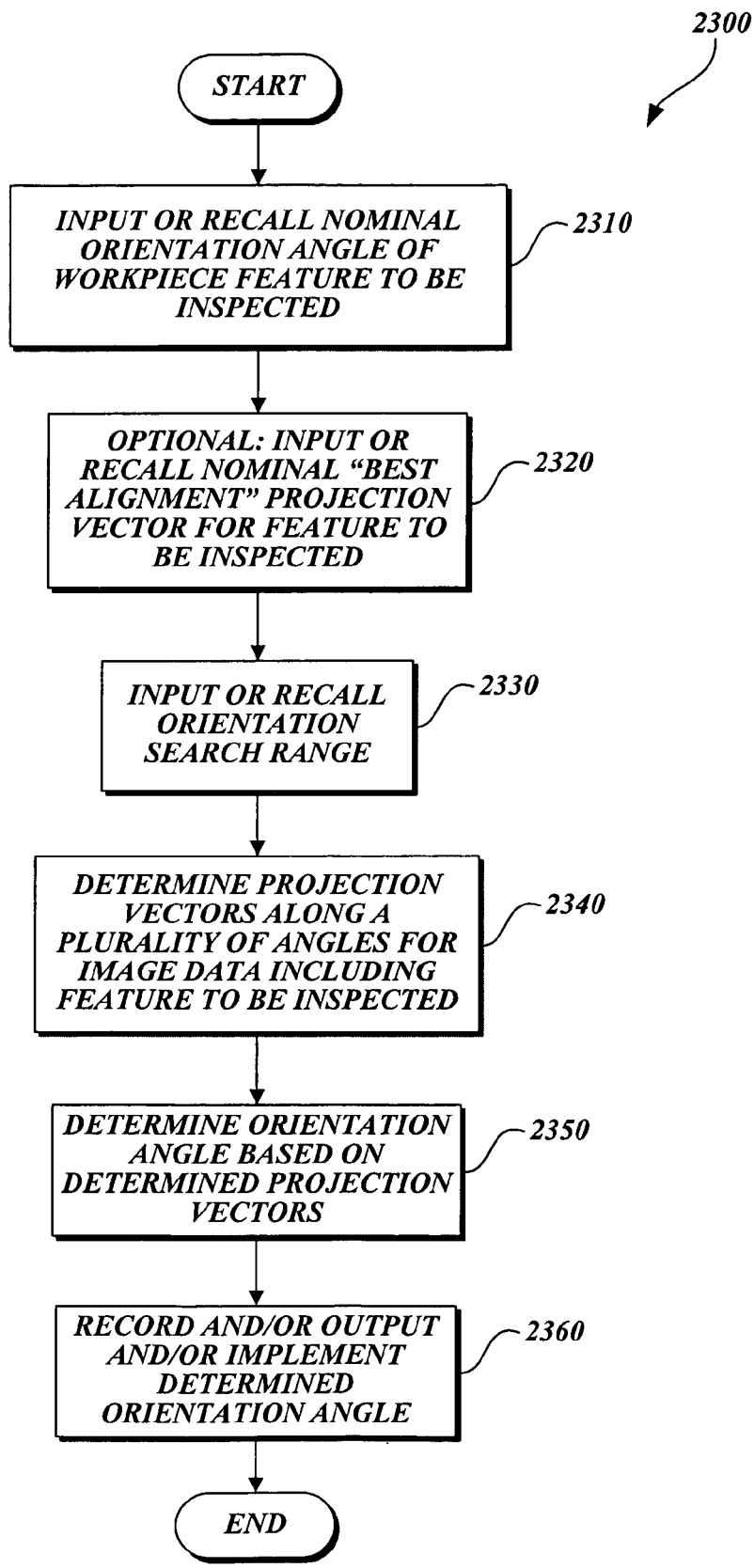
FIG. 23 is a flow diagram illustrative of one exemplary embodiment of a routine for determining the orientation of a linear workpiece feature to be inspected in a corresponding region of interest of an image.

FIG. 23 is a flow diagram illustrative of one exemplary embodiment of a routine 2300 for automatically determining a workpiece feature orientation angle usable as the orientation angle for a corresponding structuring element. The routine 2300 can be implemented to determine an orientation angle with good accuracy and in a relatively short execution time. In one embodiment, the routine 2300 may be utilized in the operations at blocks 2120-2130 of FIG. 21. More generally, the operations of the routine 2300 may be used in any situation where it is desired to automatically determine the orientation angle of a workpiece feature such that the same orientation may be used for the corresponding structuring element to be used for filtering an image of that workpiece feature.

The operations of the routine 2300 begin at a block 2310, where a nominal orientation angle of the workpiece feature being analyzed is input or recalled. For example, in one possible implementation, when a user interface such as that described for FIGS. 14-20 is used, the nominal orientation angle of the workpiece feature may be input in the "Angle" box of the Rotation dialog box shown in FIG. 20 by a user. The nominal angle may be based on CAD data, or guessed or measured by the user based on an image of the feature, which may be displayed during a manual mode or a learn mode of operations. When the nominal angle is entered during the creation of a part program in a learn mode of operation, then the value is included in or with the part program, and recalled during the operations of block 2310 during a run mode of operation. The routine then continues from block 2310 to an optional block 2320 in one version of the routine 2300. Otherwise, the routine continues to a block 2330.

At the optional block 2320, a nominal "best-alignment" projection vector, determined during a learn mode of operation and included in or with a part program, may be input or recalled during a run mode of operation. The nominal best-alignment projection vector may have been determined by various methods, such as those described with reference to FIG. 22, for example. In one version of the routine 2300, the recalled nominal best-alignment projection vector is used in correlation operations to determine the orientation angle of the workpiece feature at block 2350, as described further below. Operation continues from block 2320 to the block 2330.

At block 2330 a feature orientation search range is input or recalled. The search range generally defines the limits of an angular range for searching for and estimating the orientation of the workpiece feature to be inspected. For example, in one possible implementation, when a user interface such as that described for FIGS. 14-20 is used, the search range may be input in the "Range" box of the Rotation dialog box shown in FIG. 20 by a user, and will be active when the "Optimize" enabling check box is checked. In some implementations, the search range should be set to encompass the expected range of feature orientation variations about the nominal feature orientation, based on part fabrication tolerances and fixturing tolerances, or the like. In general, it is desirable to set the search range to exclude the orientation of linear features that are not the feature to be inspected, since these may also lead to large projection vector derivative values, or otherwise be difficult, or more time-consuming, to distinguish from the workpiece feature to be inspected by analytical methods. However, if it is not possible to set the search range to exclude such features, additional analysis may still exclude such features and identify the orientation of the workpiece to be inspected, as described further below. Operation continues from block 2330 to the block 2340.

At the block 2340, based on the image of the workpiece feature to be inspected, projection vectors are determined for a plurality of angles in the search range, for example as previously described with reference to FIG. 22. Operation then continues to block 2350, where operations are performed to determine the orientation of the workpiece feature to be inspected, based on the projection vectors determined by the operations of block 2340. In some implementations or applications, the search range is set at block 2330 to exclude the orientation of linear features that are not the feature to be inspected. In such cases, the orientation angle of the workpiece feature may be identified as the angle corresponding to the projection vector having the largest derivative.

In some cases, it is not practical for the search range to exclude other linear features. Thus, in some implementations, additional characteristics or parameters of the projection vectors may be considered. For example, a feature width and/or polarity parameter (that is, a parameter related to whether the feature is generally brighter or darker than its surroundings) may be considered. The separation and polarity of the projection vector derivatives, such as those shown in the chart 2260 of FIG. 22, may be used to determine such parameters, for example. In some implementations, such parameters may be determined during a learn mode of operation and included in or with a part program, and may be input or recalled during a run mode of operation.

In other implementations, when the operations of the block 2320 are performed such that the nominal best-alignment projection vector is available for the workpiece feature, correlation operations may be used to comprehensively distinguish the projection vector indicating the orientation of the workpiece feature to be inspected from projection vectors indicating the orientation of other features. That is, the data of the projection vectors determined by the operations of block 2340 may be correlated with the data of the input or recalled nominal best-alignment projection vector, using any appropriate conventional or known correlation technique, and the projection vector exhibiting the best correlation value corresponds to the orientation of the workpiece feature to be inspected. In any case, if desired, the estimate of the orientation angle in the operations of block 2350 can be improved by determining the projection vectors at more closely spaced angles and/or interpolating to find the angle corresponding to the peak of a curve comprising various derivative value extrema, as described above in relation to FIG. 22.

Operation continues from block 2350 to the block 2360, where the determined orientation angle of the workpiece feature to be inspected is recorded and/or output and/or implemented as the basis for orienting the structuring element to used in morphological filtering operations associated with the workpiece feature to be inspected. Then the routine 2300 ends. Experimental results based on the techniques outlined above show excellent accuracy, generally allowing an orientation determination with 1° resolution and repeatability, or better, and may generally be executed in approximately 100 ms on at least one type of commercially available machine vision inspection system.

Various aspects of the foregoing description with regard to determining the orientation of linear feature to be inspected may be made clearer or supplemented by the description of similar or applicable aspects described in the previously incorporated '823 Application. For example, the '823 Application describes various aspects of manually determining a line orientation using the video tools of a typical machine vision inspection system, as well as various aspects of semi-automatically or automatically determining a line orientation using a Radon transform technique. In general, techniques that apply the Radon transform or its variants offer another alternative approach that is usable in various methods for determining the orientation of a linear workpiece feature. Thus, the foregoing methods and alternatives outlined with reference to FIGS. 22 and 23 are illustrative only, and not limiting.

It will be appreciated that the utilization of a filtering approach (e.g., morphological filtering) to remove an extraneous feature (e.g., a grid) can be separated from the actual image feature measurement process (e.g., line tool, circle tool, etc.). In other words, once the image is filtered, any edge measurement tool can be utilized to measure the feature. Thus, as new or improved edge measurement methods are developed, they can be utilized in combination with the methods of the present invention.

It will be appreciated that the methods of the present invention also provide for simple operation by a user, in that standardized types of video tools may be utilized, rather than requiring customized operations. In other words, a user is not required to utilize scripting languages for implementing customized operations. Instead, the system allows for the use of pre-programmed icons and the like that even an unskilled user is able to use with minimal training. Furthermore, as noted above, the region of interest is able to encompass both the occluded and occluding features. Thus, it is not required to restrict inspection operations to small non-occluded regions of the workpiece feature to be inspected. This is valuable, in that small regions of a workpiece are more likely to fall outside of small regions of interest due alignment variations during run mode operations, and more likely to be altered in appearance, or occluded, by workpiece fabrication variations.

It should be appreciated that certain existing machine vision inspection systems can employ various embodiments of the systems and methods according to this invention with minimal or no "retrofit" modifications to such existing machines. In various exemplary embodiments, only the addition of machine vision inspection software methods and/or modifications according to the principles of this invention are included in the retrofit modifications.

While this invention has been described in conjunction with the exemplary embodiments outlined above, numerous alternative operation sequences and other operation variations are possible and various other alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications, variations, improvements, and/or substantial equivalents.

The embodiments of the invention in which an exclusive property or privilege is claimed are defined as follows:

1. A method for inspecting a workpiece feature that is proximate to an occluding feature in a workpiece image acquired by a machine vision inspection system, the machine vision inspection system having a user interface that is used to define a sequence of operations that are used to inspect the workpiece image, the machine vision system being utilized to perform the method, the method comprising:

acquiring a first workpiece image;

choosing a shape of a structuring element based on the shape of the workpiece feature to be inspected in the workpiece image, such that the shape of the structuring element is similar to the shape of at least a portion of the workpiece feature to be inspected;

filtering the first workpiece image using the structuring element, at least in a region including the workpiece feature to be inspected, to provide a filtered image at least in a region including the workpiece feature to be inspected; and inspecting the workpiece feature in the filtered image, including performing operations defined by at least one video tool which defines a region of interest located proximate to the workpiece feature in the first workpiece image and performing those operations for a congruent region of interest in the filtered image.

2. The method of claim 1, further comprising determining an orientation of the workpiece feature to be inspected and choosing an orientation of the structuring element based on the orientation of the workpiece feature to be inspected, such that the shape of the structuring element that is similar to the shape of at least a portion of the workpiece feature to be inspected is oriented similarly to the at least a portion of the workpiece feature to be inspected.

3. The method of claim 2, wherein determining the orientation of the workpiece feature to be inspected comprises at least one of (a) estimating the orientation of the workpiece feature based on user observation of a current workpiece image including the workpiece feature, (b) estimating an approximate orientation of the workpiece feature and automatically determining the orientation more accurately for a current image including the workpiece feature by analysis of the current image, and (c) during execution of a part program in a run mode of operation, recalling a nominal orientation of the workpiece feature, and automatically determining the orientation more accurately for a current image including the workpiece feature by analysis of the current image.

4. The method of claim 3, wherein:

determining the orientation of the workpiece feature to be inspected comprises automatically determining the orientation more accurately for a current image including the workpiece feature;

analysis of the current image comprises determining a plurality of respective projection vectors along a plurality of corresponding respective angles; and automatically determining the orientation more accurately comprises automatically analyzing the plurality of respective projection vectors.

5. The method of claim 1, wherein automatically analyzing the plurality of respective projection vectors comprises determining a best-alignment projection vector by operations including at least one of (a) determining the best alignment projection vector based on analyzing the respective maximum magnitude derivatives of the respective projection vectors, and (b) determining the best alignment projection vector based on analyzing respective correlation values corresponding to correlating the respective projection vectors with a nominal best-alignment projection vector determined during learn mode operations.

6. The method of claim 4, wherein automatically analyzing the plurality of respective projection vectors comprises automatically determining an angle corresponding to the peak of a curve fit to the respective maximum magnitude derivatives of the respective projection vectors and determining the orientation of the workpiece feature to be the orientation corresponding to the determined angle corresponding to the peak.

7. The method of claim 1, wherein filtering the first workpiece image using the structuring element comprises a number of iterations, the structuring element has a respective dimension along a respective direction, and the number of iterations times the respective dimension is at least as large as a dimension of the occluding feature along the respective direction.

8. The method of claim 7, further comprising choosing an orientation of the structuring element based on an orientation of the workpiece feature to be inspected, such that the shape of the structuring element that is similar to the shape of at least a portion of the workpiece feature to be inspected is oriented similarly to the at least a portion of the workpiece feature to be inspected, and wherein the respective direction is approximately parallel to the orientation direction of the portion of the workpiece feature to be inspected.

9. The method of claim 1, wherein the shape of the structuring element is chosen from a predefined set of shapes that are usable for structuring elements.

10. The method of claim 1, wherein the shape of the structuring element is nominally one of a line and a rectangle, and the length of the structuring element is at least 58 pixels.

11. The method of claim 1, wherein the workpiece feature to be inspected is a linear feature and the structuring element is a rectangular element having a width of at least 3 pixels.

12. The method of claim 1, wherein the shape of the structuring element is circular and the nominal diameter is at least 13 pixels.

13. The method of claim 1, wherein the shape of the structuring element is circular, the occluding feature is a grid having a bar width or thickness T, and the nominal diameter of the structuring element is at least as large as 2T+1 pixels.

14. The method of claim 1, wherein the step of filtering the first workpiece image using the structuring element comprises using the user interface to define a sequence of morphological filtering operations used for filtering the first workpiece image using the structuring element; and the step of choosing the shape of the structuring element comprises using an element of the user interface to define the shape of the structuring element used in the morphological filtering operations, such that the shape of the structuring element is defined to be similar to the shape of the at least a portion of the workpiece feature to be inspected.

15. The method of claim 7, further comprising using the user interface to define the respective dimension of the structuring element.

16. The method of claim 1, wherein choosing an orientation of the structuring element based on the orientation of the workpiece feature to be inspected comprises using the user interface to define a nominal orientation angle of the structuring element.

17. The method of claim 1, wherein the at least one video tool operates to define inspection operations on either unfiltered workpiece images and morphologically filtered workpiece images without altering the operation of the video tool.

18. The method of claim 1, wherein the inspection of the workpiece feature comprises performing edge detection on the workpiece feature.

19. The method of claim 17, wherein the edge detection is utilized in conjunction with measurement operations for measuring the workpiece feature.

20. The method of claim 1, wherein the filtering removes at least a portion of the occluding feature from the filtered image at least in a region including the workpiece feature to be inspected.

* * * * *

UNITED STATES PATENT AND TRADEMARK OFFICE
CERTIFICATE OF CORRECTION

PATENT NO. : 7,583,852 B2 Page 1 of 1
APPLICATION NO. : 10/974423
DATED : September 1, 2009
INVENTOR(S) : V. Venkatachalam It is certified that error appears in the above-identified patent and that said Letters Patent is hereby corrected as shown below:

On the Title Pg
Item (73)     Assignee     "Kawaski-shi" should read
                           --Kawasaki-shi--

Item (57)     Abstract     "corresponds" should read
              line 8 of text  --correspond--

Col. 34       line 30      "The method of claim 17," should read --The method
(Claim 19)                 of claim 18,--

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,583,852 B2 Page 1 of 1
APPLICATION NO. : 10/974423
DATED : September 1, 2009
INVENTOR(S) : Vidya Venkatachalam It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1301 days.

Signed and Sealed this

Fourteenth Day of September, 2010

David J. Kappos
*Director of the United States Patent and Trademark Office*